United States Patent [19]

Ulrich

[11] Patent Number: 4,705,354
[45] Date of Patent: Nov. 10, 1987

[54] METHOD FOR FIBER OPTIC TRANSMISSION OF A SPECIAL CODED MEASUREMENT

[75] Inventor: Reinhard Ulrich, Buchholz, Fed. Rep. of Germany

[73] Assignee: Daimler-Benz Aktiengesellschaft, Stuttgart, Fed. Rep. of Germany

[21] Appl. No.: 764,073

[22] Filed: Aug. 9, 1985

[30] Foreign Application Priority Data

Aug. 9, 1984 [DE] Fed. Rep. of Germany ....... 3429328

[51] Int. Cl.$^4$ .............................................. G01D 5/30
[52] U.S. Cl. .............................. 350/96.29; 350/96.15; 250/231 R
[58] Field of Search ............... 350/96.15, 96.29, 96.30; 250/226, 227, 231 R

[56] References Cited

U.S. PATENT DOCUMENTS

| 3,501,640 | 3/1970 | Harris . | |
|---|---|---|---|
| 4,281,245 | 7/1981 | Brogardh et al. | 250/227 |
| 4,451,730 | 5/1984 | Brogardh et al. | 250/227 |
| 4,529,875 | 7/1985 | Brogardh et al. | 250/227 |

FOREIGN PATENT DOCUMENTS 1943738 3/1979 Fed. Rep. of Germany .
1540907 2/1979 United Kingdom .

Primary Examiner—Eugene R. LaRoche
Assistant Examiner—James C. Lee
Attorney, Agent, or Firm—Barnes & Thornburg

[57] ABSTRACT

A method wherein two light fluxes $I_1$ and $I_2$, spectrally encoded by interspersing or alternating line frequency spectra, are transmitted through an optical fiber from a transducer to an evaluation unit which generates an indication signal in relation to the ratio of the optical power of the two light fluxes. Both light fluxes $I_1$ and $I_2$ are generated with distinctly different narrow-bandline structures of the spectral distribution of their optical powers with the spectral separation of adjacent lines of the two line fluxes being greater than the linewidth of these lines. The optical power of the spectrally interposed light fluxes $I_1$ and $I_2$ are measured individually after spectral separation by filters which are selected to the specific distribution of the light fluxes $I_1$ and $I_2$.

33 Claims, 20 Drawing Figures

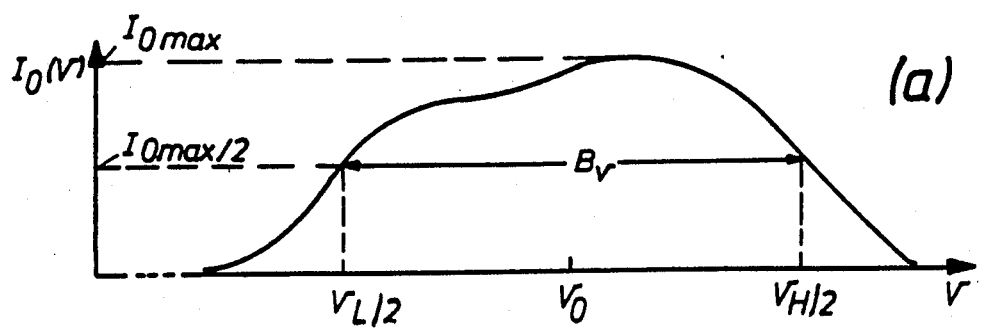
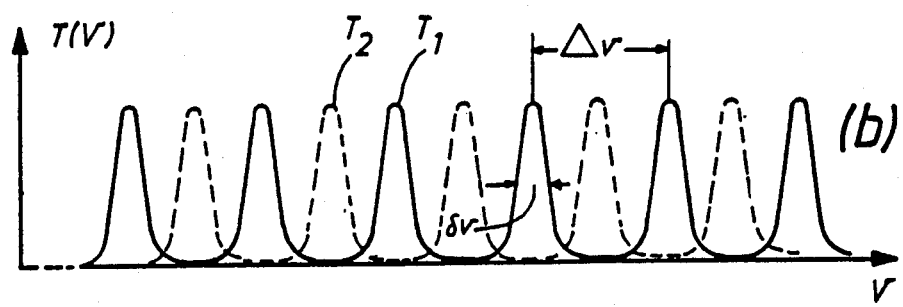
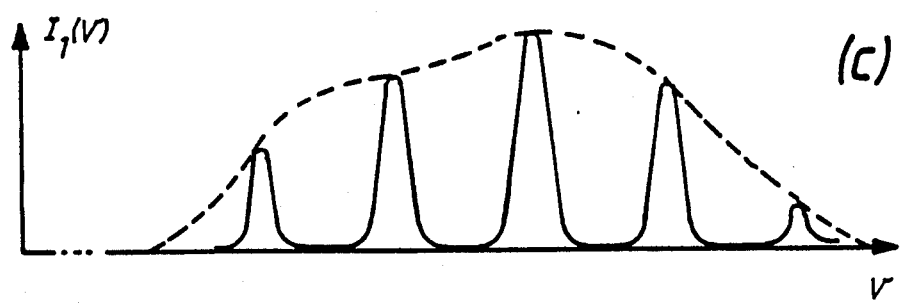
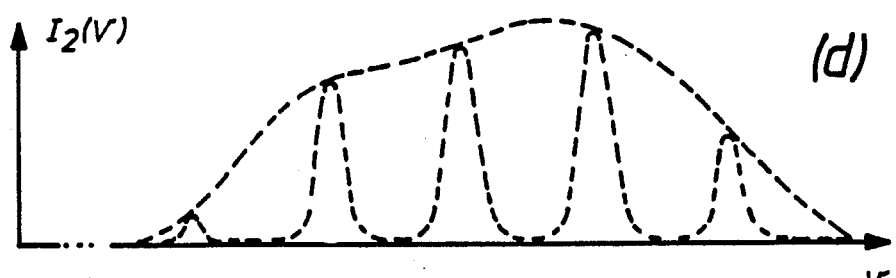
Fig.2

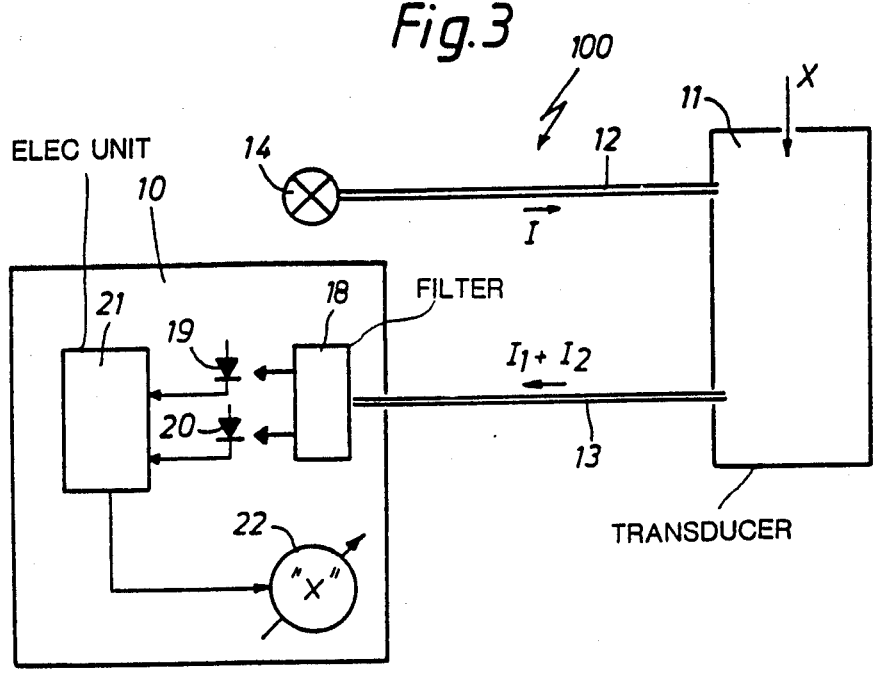
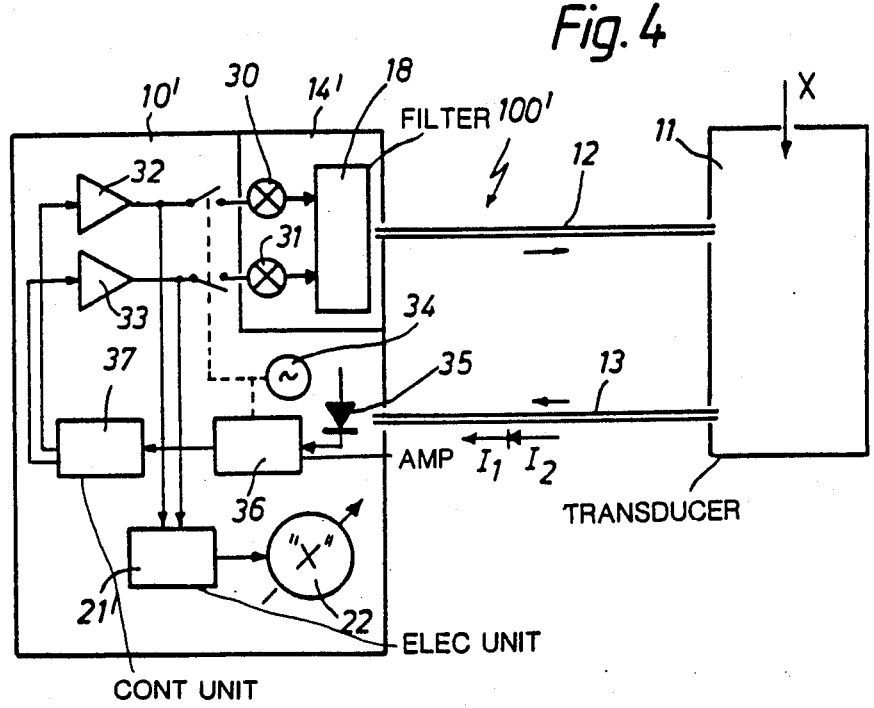

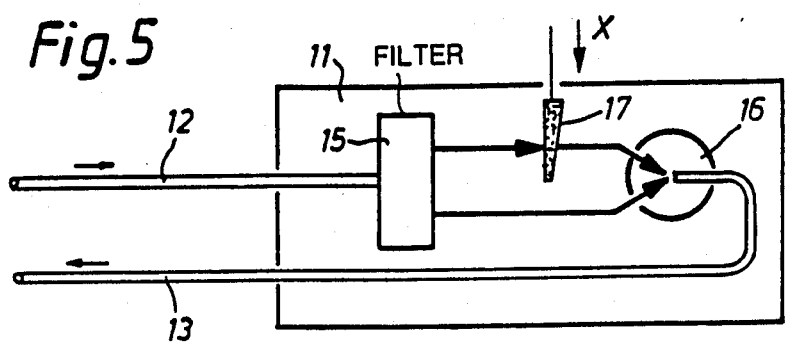
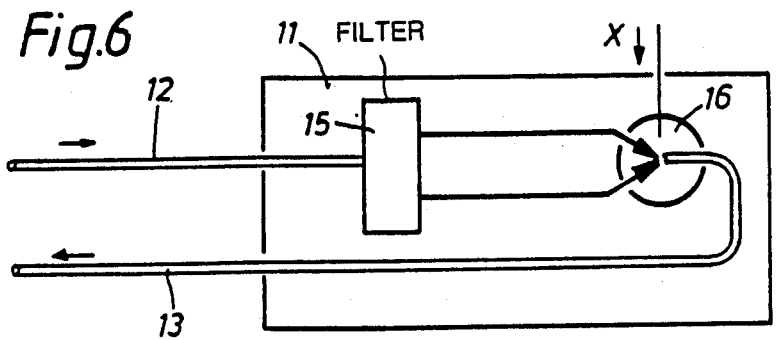
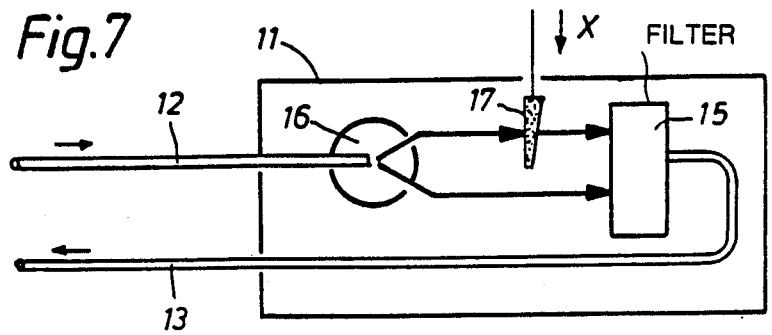
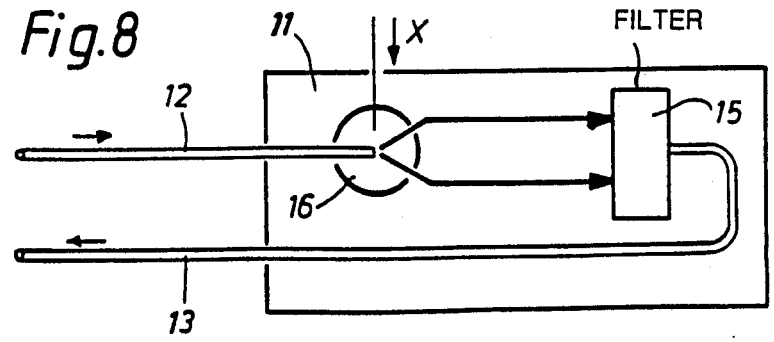

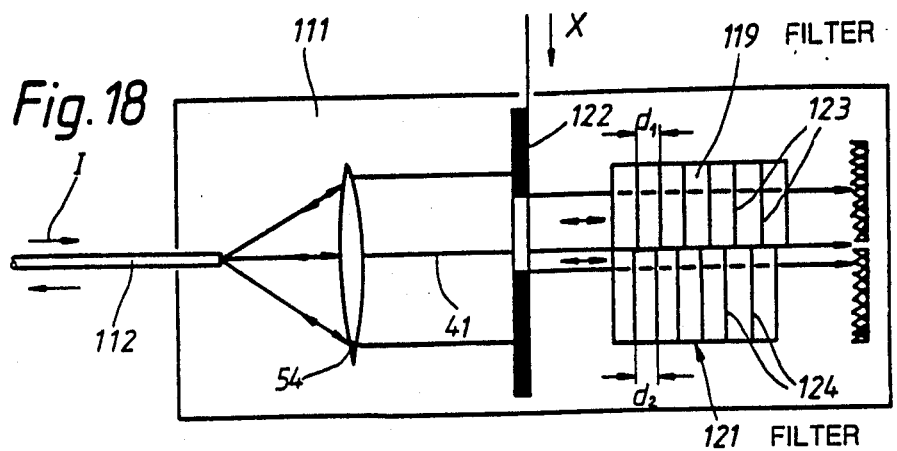
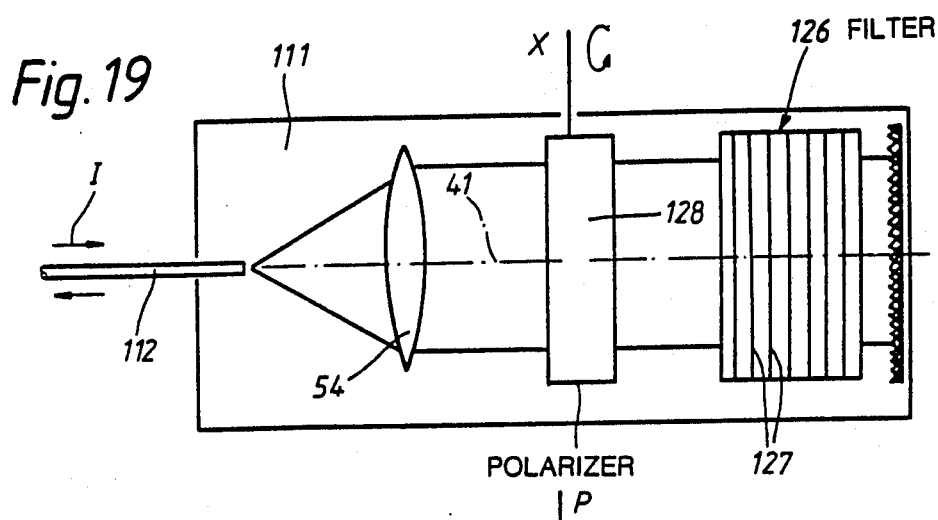
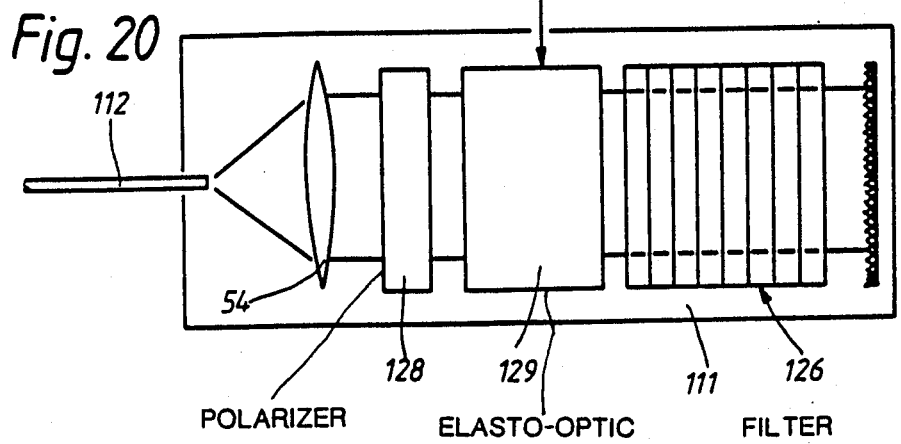

METHOD FOR FIBER OPTIC TRANSMISSION OF A SPECIAL CODED MEASUREMENT

BACKGROUND AND SUMMARY OF THE INVENTION

A method and arrangement for fiber optic transmission of a value of a spectrally encoded variable physical quantity.

The invention relates to a method and apparatus for fiber optic transmission of the value of a spectrally encoded measurant, the term "measurant" being representative of a variable physical quantity derived from a transducer sensitive to that quantity and conveyed to an evaluation unit generating desired output signals which may be used for indication or for further processing as defined by the preamble to claim 1.

Such encoding and transmission methods and arrangements should be independent from the properties of the optical fibers connecting a transducer and an evaluation unit of a fiber optic sensor system, with each other, that is, it should be avoided that optical fibers of different lengths, cross sections, losses, curvatures etc. disturb the evaluation of the desired signals which are spectrally and/or intensity modulated encoded signals which are to be evaluated in terms of the measurant; i.e., the quantity to be measured.

Fiber optic sensor systems as hereinafter referred to comprise a transducer and an evaluation unit which are optically connected by one or more optical fibers. In the transducer, a physical quantity which is to be measured —the measurant —(e.g. pressure, temperature, force, position, angle, etc.) is converted or "encoded" into an optical signal which is guided by the optical fiber to the evaluation unit. There the optical signal is decoded by the evaluation unit which determines the value of the physical quantity existing at the transducer from the optical signal. This value is then indicated, recorded or processed in a suitable fashion, for example in a control circuit.

Because of the excellent insulation of optical fibers, such fiber optic sensor systems provide perfect electrical insulation between the transducer and the evaluation unit. Therefore, such sensor systems can be used without further protective means in systems of high electrical voltage (supervision of transformers), medical application (no danger of electrical shocks) and also in petrochemical plants and mining installations (no danger of short-circuit or ignition) and automotive engineering (functional supervision).

Therefore, a considerable number of operating principles had been suggested and demonstrated for fiber optic sensor systems such as described in the article "Optical Fiber Sensor Technology" by T. G. Giallorenzi et al., IEEE Journal of Quantum Electronics, Volume QE-18 (1982), S.626-655. Among these operating principles, one sub-group is of the particular interest because of its simplicity. In this group of fiber optic sensor systems, the mentioned encoding is performed by simple intensity-modulation; e.g., by means of a light gate or a shutter. A light flux emitted by a light source, arranged in the evaluation unit, is guided by an optical fiber to the transducer. There the light flux is attenuated more or less according to the existing value of the measurant. The remaining light flux is passed over the same or another fiber to a detector in the evaluation unit. There a detector signal is generated in proportion to the arriving optical power; this signal then is characteristic for the value of the measurant.

One advantage of this operational principle is that the analogue intensity modulation employed here for the encoding can be realized technically in a very simple manner by displacements or rotations of apertures which are placed in the light path and which pass a fraction of the light flux depending on their position. Other important advantages are that the fiber optic sensor systems can be equipped with inexpensive multimode optical fibers and can be operated with light emitting diodes, which are known to be very reliable, small and lightweight. It is also possible to obtain an extremely high sensitivity by a suitable arrangement of the modulation apertures. One example which is typical for this group of sensor systems is the "Schlieren Multimode Fiberoptic Hydrophone" (Applied Physics Letters, Vol. 37, 1980, S. 145 ff).

In this sensor system, the intensity modulation is achieved by passing the light flux consecutively through two closely adjacent parallel line gratings which form kind of a Moiré-Modulator. If one of these gratings is moved by the width of one grating line (typically 5 $\mu$m) this modulator changes from a state of maximum light transmission to a state of minimum light transmission. Therefore, this arrangement is primarily a displacement sensor. In this specific application, a hydrophone (underwater accoustic pressure sensor) is formed from the displacement sensor by connecting one of the gratings with an elastic diaphragm. The pressure which is to be measured displaces this diaphragm and this displacement is measured. Therefore, the diaphragm operates as a pressure displacement converter. In the same sense the mentioned displacement modulator could also be used for a construction of fiber optic thermometers, dynamometers, accelerometers, and transducers for other physical quantities. By using instead of the diaphragm, corresponding other types of transducers e.g., a bimetallic strip (temperature → displacement), and elastic body (force → displacement) or a probe mass connected to an elastic body (acceleration → force → displacement), a great variety of useful applications is obtained. Another simple fiber optic sensor system which also belongs to the mentioned group using analogue intensity modulation is the fiber optic thermometer described by A. J. Rogers (Applied Optics, Vol. 21, 1982, S.882-885). In this instrument, the light flux which is guided through an optical fiber to the transducer is not attenuated by a mechanically moved aperture but by means of a temperature-dependent polarization-optical arrangement. The output light flux is guided then to the evaluation unit which produces an indication signal in proportion to detector signal.

The two fiber optic systems mentioned and many other fiber optic systems corresponding to the state of the art and belonging to the mentioned sub-group employing encoding of the measurant by analogue intensity modulation, all exhibit the fundamental disadvantage that their evaluation units cannot distinguish whether a change of the light flux received at the detector is the result of a change of the measurant or whether such change results from fluctuations of the fiber losses. Such fluctuations may result e.g., when the fiber is curved or when in a fiber cable the temperature or the mechanical tension of the fiber vary. A further disadvantage is that such fiber optic sensor systems generally have to operate with permanently installed fibers of fixed length. The use of fiber optic connectors is not possible because such connectors usually cause non-reproducable losses. Any reconnection of the fiber-optic connectors may cause a variation of the transmitted light flux, and thereby, an uncertainty in the indication of the measurement. In the same sense, the installation of fibers of different lengths or different losses would also cause problems, affecting the calibration of the sensors of this mentioned sub-group.

For this reason some improved fiber optic sensor systems utilize a second transmission channel which transmits a reference light flux which is not affected by the measurement or is affected in an opposite sense. In these systems the measurant is no longer determined in the evaluation unit from the absolute power but rather by evaluating the ratio of the power of the received light fluxes in the signal and reference channels. If the mentioned fluctuations of the fiber losses happen to be identical in both channels, then the absolute optical power of the light fluxes may vary, but their ratio remains unaffected and the indication is independent of such fluctuations. Such an encoding of the measurant into the ratio of the intensity of two light fluxes is used in the fiber optic sensor system described by H. Dötsch et al., IEEE Conference Proceedings Nr. 221, "Optical Fiber Sensors", London 1983, S. 67–71. In this system, a movable lens in the transducer splits the arriving light flux into two partial light fluxes which are coupled into the fibers leading to the evaluation unit. The measurant influences the position of the lens, and thereby, couples more light into the one or the other fiber according to the value of the measurant, in such a manner that the ratio of the two partial light fluxes should uniquely represent the measurant.

Actually, however, such a compensation of fluctuating fiber losses is not fully effective, because the signal- and reference-channels are guided by two different optical fibers to the evaluation unit and, therefore, are not subjected to exactly the same environmental effects. A broad practical application of such sensor systems suffers from the expensive necessity to have an additional reference fiber, in addition to the mentioned non-reproducable losses in fiber optic connectors which in general tend to be different in each channel. For this reason the use of fiber optic connectors is practically impossible up to now in fiber optic sensor systems of the described kind, resulting in their use being considerably restricted.

To avoid these problems, it might be superficially taken into account to transmit the two light fluxes simply at two different optical frequencies, e.g., in the green and the red spectral range. Such a solution, however, is not satisfactory in practice because most kinds of fiber losses are strongly dependent on the optical frequency; the same holds for the detector sensitivity, giving additional rise to calibration problems. Therefore, a transmission with two optical frequencies far apart from each other cannot be transmission independent of the fiber properties. To be "independent of the properties of the fiber" in this context means that the two light fluxes should be subjected as closely as possible in the same manner to all kinds of fiber losses during the transmission, i.e., absorption, scattering losses, curvature losses and coupling losses in connectors, splices, and variations of fiber-cross sections. For achieving a transmission which is independent of the properties of the optical fiber, it would be necessary to choose two very closely adjacent optical frequencies so that their separation $\Delta\nu$ is very small compared to the average frequency $\nu_o$ of the two light fluxes. Moreover, the spectral line-width $\delta\nu$ of said light fluxes should be kept small as well, e.g. $\delta\nu \simeq \Delta\nu$. Optical filters satisfying these conditions are possible but expensive, and such filters would pass only a very small fraction corresponding to the line-width of the continuous spectrum of the light emitting diode, resulting disadvantageously in a reduced detection-sensitivity and accuracy.

It is, therefore, the primary object of the invention to define a fiber-optic encoding and transmission method of the initially mentioned kind for optical signals into which the value of a measurant is encoded in such a manner that the transmission is substantially independent of the properties of a fiber through which the signals are transmitted to an evaluation unit, and which also enables a simple evaluation of these signals in units of the measurant, and it is further an object of the invention to provide an arrangement for performing the method.

With respect to the method according to the invention, two light fluxes $I_1$ and $I_2$, spectrally encoded by interspersing or alternating line frequency spectra, are transmitted through an optical fiber from a transducer to an evaluation unit which generates an indication signal in relation to the ratio of the optical power of the light fluxes. These light fluxes propagating through one and the same optical fiber and connecting elements (fiber connectors) between this fiber and the transducer and the evaluation unit, respectively, are subjected to exactly the same influences of the environment; these influences effectively being eliminated, with the transmission being independent of the properties of the optical fiber to a highest degree. Due to the interspersed line structure of the spectral distribution of the light fluxes, the two light fluxes, which are to be compared with each other, have, at least in a very good approximation, the same mean wavelength, with the advantageous consequence, that wavelength dependent influences on the light fluxes $I_1$ and $I_2$ are eliminated. The same holds for any dependencies of the detector sensitivity on the wavelength, because, due to the spectral interspersing of the light fluxes $I_1$ and $I_2$, the effective detector sensitivity is the same for both light fluxes. Furthermore, supposing a minimum line-width of the component lines of the light flux spectra $I_1$ and $I_2$, the higher the number of lines contributing to each one of the light fluxes $I_1$ and $I_2$, the better is the signal/noise-ratio and the higher measurement accuracy. By the method according to the features of claim 2, a best approximation of the ideal case of absolute equality of the mean wavelengths of the partial light fluxes $I_1$ and $I_2$ may be achieved, e.g., in the manner that one partial light flux consist of only one spectral line and the other partial light flux of two lines, the average wavelength of which just corresponds to the wavelength of the spectral line of the first mentioned light flux. This method may be performed, for example, by using laser light sources.

By the features of claims 3 and 4, modifications of the method according to the invention are defined which may be used alternatively. According to one of these modifications both partial light fluxes $I_1$ and $I_2$ are transmitted simultaneously and detected by separate detectors; according to the other modification an interspersing of two partial light fluxes $I_1$ and $I_2$ with respect to time is used and the evaluation of the intensity ratio occurs by synchronous rectification of alternatively received pulses of the light fluxes $I_1$ and $I_2$, respectively.

By the features of claims 5 and 7 alternative embodiments of arrangements for performing the method according to the invention are defined.

By claims 7 through 24 alternatively or in suitable combinations thereof, usable embodiments of transducers are defined which may be used within the arrangements according to claims 5 and 6. These transducers are adapted to an operation in transmission and are characterized by structural simplicity and functional reliability. Claim 25 defines a further arrangement according to the invention, adapted to an operation in the reflection mode. Transducers as defined by claims 26 through 33 may be used within an arrangement according to claim 25, wherein only one single optical fiber is needed which provides for the optical connection of the transducer between both a light supply unit and an evaluation unit. The light fluxes $I_1$ and $I_2$ emerging from the reflective transducers are directed to the evaluation unit by means of a partially transparent mirror in an arrangement commonly known from beam splitter or beam-recombination units.

Further features and advantages of the invention become apparent from the following detailed description and from the drawing, in which:

BRIEF DESCRIPTION OF THE DRAWINGS

FIG. 2(a) shows a typical spectral distribution of the intensities of a light source usable within the sensor system according to FIG. 1;

FIG. 2(b) shows transmission characteristics of transmission filters defining the spectral compositions of partial light fluxes $I_1$ and $I_2$;

FIG. 2(c) and 2(d) show the spectral composition of partial light fluxes $I_1$ and $I_2$ used to transmit the value of a measurant;

FIG. 3 and FIG. 4 are block diagrammatic representations of alternative embodiments of fiber optic sensor systems according to the invention;

FIG. 5 to FIG. 8 show alternative modifications of transducers suited for use within fiber optic sensor systems according to FIG. 3 or FIG. 4;

FIG. 18 shows a special embodiment of a transducer similar to that shown in FIG. 17; and FIG. 19 and FIG. 20 show transducers suited for the reflection mode and functional equivalent to the transducers according to FIGS. 11 and 12.

In FIG. 1 and FIGS. 3 through 20 of the drawing, elements of equal or similar constructive and/or functional properties are designated with the same reference numerals.

DETAILED DESCRIPTION OF THE DRAWINGS

Figure 1:
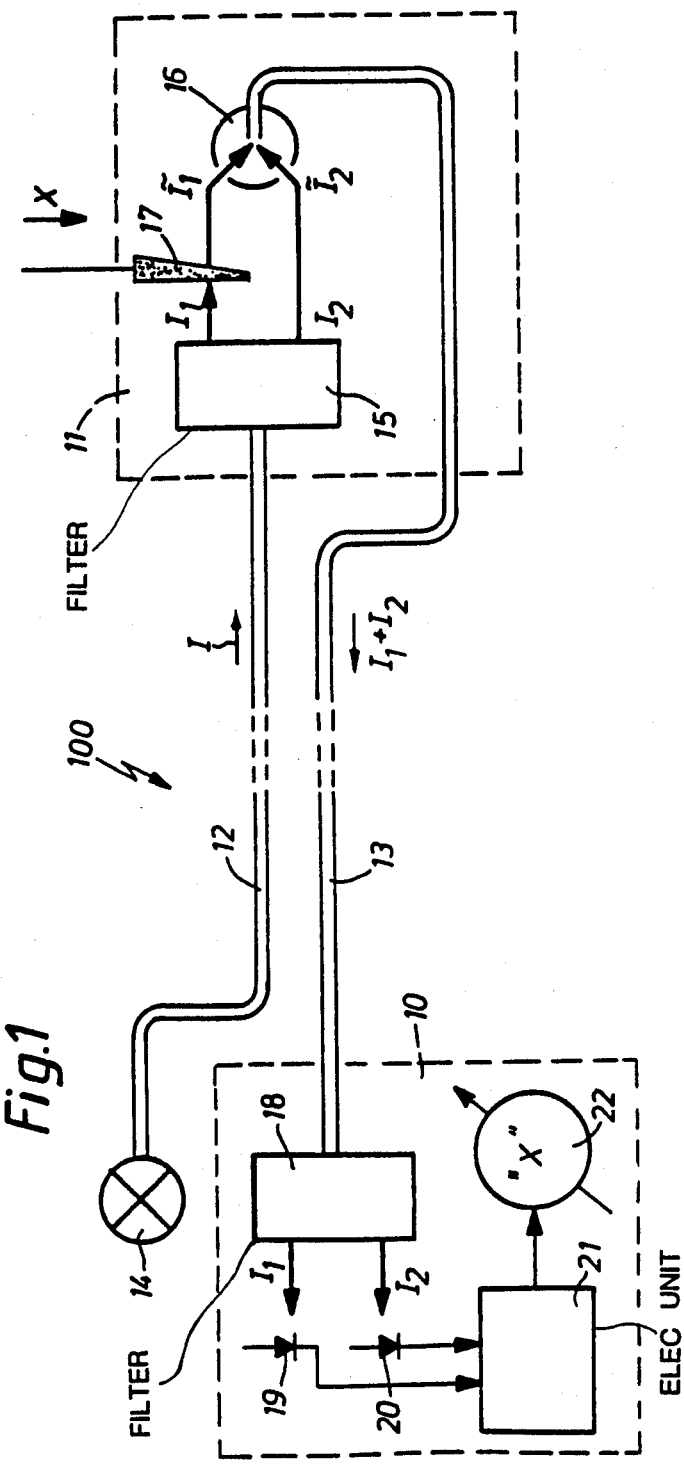
FIG. 1 shows the basic structure of a fiber optic sensor system according to the invention as an arrangement for performing a method for a spectrally encoded transmission of a variable physical quantity, in a simplified diagnammatic representation.

With reference to FIG. 1 and 2, and to all of their details, in the following the basic structure of a fiber optic sensor system, generally designated by reference numeral 100, is explained which represents an arrangement for carrying out a method for the transmission of the value of a spectrally encoded measurant representative of a variable physical quantity "x" this method being explained in some more detail with respect to FIG. 2. FIG. 1 is showing a fiber optic sensor system 100 by which the measurant x is encoded into the intensity ratio of two light fluxes $I_1$ and $I_2$. The sensor system 100 comprises a light source 14 having a continuous emission spectrum $I_0(\nu)$, a transducer 11 which provides for the encoding of the measurant x into the ratio of the intensities of the two light fluxes $I_1$ and $I_2$ which are generated by a—spectral—division of a primary light flux I which is emitted from the light source 14 and coupled into the transducer 11, and an evaluation stage 10 which provides for a decoding of the intensity ratio of the two light fluxes $I_1$ and $I_2$ in units of the measurant x and generates an output signal which is characteristic of the measurant and which is indicated by means of an indicating instrument 22 in units of the measurant, or which is used for further processing, e.g. to control a pump used to recharge a pressure storage, the pressure of which is not allowed to drop below a lower threshold value, in this example the measurant x being the pressure in said pressure storage.

Light which is emitted by the light source 14, e.g. a luminescence diode, is fed as the primary light flux I through a first optical fiber 12 to the transducer 11. In this transducer 11, as an input stage, a first pair 15 of filters is provided, which—spectrally—subdivides the primary light flux I into the partial light fluxes $I_1$ and $I_2$.

By means of a pair 15 of the filters which is merely schematically depicted in FIG. 1, characteristic—different—spectral intensity distributions with narrow-band line-shaped forms of the spectral distribution of the optical powers are imparted to the partial light fluxes $I_1$ and $I_2$ resulting from the subdivision of the primary light flux I. This is done in such a manner, that a spectral line of one light flux, e.g. the light flux $I_1$, is spectrally interposed between two lines of the other light flux $I_2$; thereby a spectral interspersing of the two light fluxes $I_1$ and $I_2$ is achieved, and the spectral separation of a line of one of the light fluxes, e.g. the light flux $I_1$, from a spectrally adjacent line of the other light flux $I_2$ always being larger than the line widths of these spectral components of the two light fluxes $I_1$ and Ihd 2.

In the embodiment of a fiber optic sensing system shown in FIG. 1, and chosen for a basic exemplary explanation of the invention, the output partial light fluxes $I_1$ and $I_2$ of the first pair 15 of filters are spatially separated from each other. Within the transducer a modulator is provided, e.g., an aperture 17 shiftable in the direction transverse to the direction of propagation of the light flux $I_1$, said modulator changing the optical power of the one light flux $I_1$ emerging from the pair 15 of filters to values $I_1(x)$, which are related to the shift of the aperture 17. In the embodiment according to FIG. 1, the optical power of the other partial light flux $I_2$ emerging from the pair 15 of filters is not influenced by the modulator 17. In a recombination unit 16 which is provided as an output stage of the transducer 11, the two partial light fluxes are recombined with each other in the sense that they are superimposed and commonly transmitted through a second optical fiber 13 to the evaluation unit. Within the evaluation unit 10 a second pair 18 of filters is provided having the same transmission characteristics as the first pair 15 of filters provided within the transducer 11, and being optically connected with the output of the light flux recombination unit 16 by the optical fiber 13. The second pair 18 of filters of the evaluation unit 10 is again separating the two partial light fluxes $I_1$ and $I_2$, commonly transmitted through the optical fiber 13 to the evaluation unit 10, and the intensities of the two light fluxes are sensed each by one of two detectors 19 and 20, the output signal of one of these detectors, e.g. of the detector 19, being proportional to the intensity of that partial light flux $I_1$ which is subjected to modification by the modulator 17, and the output signal of the other detector 20 being proportional to the intensity of the other partial light flux $I_2$ which—in the embodiment shown in FIG. 1—is not influenced by the modulator 17. Within the evaluation unit 10, an electronic unit 21 is provided as an element for further processing which generates an output signal which corresponds to the ratio $R = S_1/S_2$ of the signal-levels of the detector-output signals $S_1$ and $S_2$, and which may be indicated by means of indicating instrument 22. If the partial light flux $I_1$ is modulated within the transducer 11 e.g. in that if its optical power is more or less reduced from an original value $I_1$ to a lower value $I_1$, then, the indication of indicating instrument 22 is correspondingly reduced. Supposing that the position of the modulating element 17—having an aperture or a neutral wedge filter is controlled in dependence on the measurant, and that the indicating instrument 22 is calibrated in units of the measurant x, the fiber optic arrangement according to FIG. 1 is a sensor system for said measurant x.

In FIG. 2, a method for spectrally encoding a measurant is illustrated which provides for a transmission of optical signals which are characteristic of the measurant between the transducer 11 and the evaluation unit 10, independent of the properties of the optical fibers 12 and 13. FIG. 2(a) illustrates schematically, the spectral distribution of the power density $I_o(\nu)$ of a light source 14 with continuous basic emission spectrum as a function of the optical frequency. The bandwidth of this basic spectrum measured between the frequency values $\nu_{L/2}$ and $\nu_{H/2}$ at which the power density of the basic spectrum is half the maximum value $I_o$ max is designated by $B_\nu$. Further, FIG. 2(b) illustrates spectral transmission characteristics $T_1(\nu)$ and $T_2(\nu)$ and required for the pairs 15 and 18 of filters. Each of these two transmission characteristics corresponds to a line spectrum with a typical spectral separation $\Delta\nu$ between adjacent lines of those filters 15 and 18, respectively, and with a typical spectral line width $\delta\nu$. With respect to the partial light flux $I_1$, the transmission characteristics $T_1(\nu)$ are effective, and for the other partial light flux $I_2$, the transmission characteristics $T_1(\nu)$ are effective.

In FIG. 2(b) the transmission bands of the filters 15 and 18 are illustrated for simplicity as having equal spectral separations, equal "widths" and equal "heights". These equalities, although of considerable advantage in view of the effectiveness of the method according to the invention, must not be fulfilled in full strength within the total bandwidth $B_\nu$ of the basic spectrum. On the contrary, it is sufficient, if these equalities are fulfilled approximately within a major part of the halfwidth $B_\nu$ of the basic spectrum, e.g. in that sense, that the transmission spectrum $T_2(\nu)$ might be obtained from the transmission spectrum $T_1(\nu)$ by shifting the latter by about $\Delta\nu/2$. Of major importance is that both spectra or transmission characteristics $T_1(\nu)$ and $T_2(\nu)$, respectively, are interspersed with each other in such a manner that a spectral overlapping of these characteristics is reduced to the lowest degree and that the highest multiplicity of lines is contained within the bandwidths $B\nu$ of the basic spectrum $I_o(\nu)$.

Therefore, the following relations should hold:

$$\delta\nu < \Delta\nu/2 \qquad (1)$$

$$\Delta\nu << B\nu \qquad (2)$$

Illustrated in FIGS. 2(c) and 2(d) are the intensity spectra, $I_1(\nu)$ and $I_2(\nu)$, of the partial light fluxes $I_1$ and $I_2$, respectively, which result from the filter transmission characteristics and from the basic emission spectrum $I_o(\nu)$ of the light source 14.

It is seen that due to the relationship of equation (2) and to the smooth shape of the basic spectrum in the frequency scale, both spectral intensity distributions $I_1(\nu)$ and $I_2(\nu)$, in a very good approximation, have the same average optical frequency $\nu_O$ and also the same total bandwidth $B\nu$, which are determined by the shape of the basic emission spectrum $I_o(\nu)$ of the light source 14. Therefore, both light fluxes $I_1$ and $I_2$ are always subjected to the same losses which result from the optical fibers 12 and 13. This advantage, by a suitable design of the pairs of filters 15 and 18, may even be used in situations where the fiber losses, which as a function of the optical frequency, are strongly dependent thereupon; as it is for example known with respect to scattering losses which typically increase in proportion to $\nu^2$. The spectral separation $\Delta\nu$ must then be chosen small enough in order to keep loss-induced differences of the spectral intensities of two spectrally adjacent lines smaller than the indication accuracy which is required for the fiber optic sensing system 100. This is always possible due to the smoothness of all real loss-spectra.

This advantage, by proper design of the pairs 15 and 18 of filters, may be achieved even if the fiber losses exhibit a relatively strong dependence on the optical frequency, as e.g., the scattering losses, typically increasing in proportion to $\nu^2$. The spectral separation $\delta\nu$ of adjacent lines must then also be chosen sufficiently small in order to keep loss-induced differences of the spectral intensities of two adjacent spectral lines smaller than the indication accuracy which is required for fiber optic sensor system 100. This requirement, due to the continuity of all real loss-spectra may be fulfilled in any case.

The fact that, when proceeding in a manner according to the invention, i.e., the spectrally encoded light fluxes $I_1$ and $I_2$ both have practically the same average optical frequency $\nu_o$ and bandwidth $B\nu$, also provides the advantage of their optical powers being detected by one and the same detector, as is useful in self-calibrating evaluation methods or devices. Presuming equal values of $\nu_o$ and $B\nu$ for both partial light fluxes $I_1$ and $I_2$, the detector exhibits the same sensitivity for both light fluxes even if their intensities should be strongly dependent on frequency.

The further, important advantage of the method for encoding according to the invention resides in the fact that a relatively large fraction of the light power may be used which is emitted within the basic emission spectrum of the light source. This fraction is approximately equal to the spectral transmission characteristics $T_1(\nu)$ and $T_2(\nu)$ of the pairs 15 and 18 of filters averaged over the bandwidth $B\nu$ of the emission spectrum. In correspondence to the filter transmission characteristics illustrated in FIG. 2(b), both these spectral average values, have the value $\overline{T}_1 = \overline{T}_2 \approx \delta\nu/\Delta\nu$, if it is supposed that the peak transmission values of the transmission characteristics $T_1(\nu)$ and $T_2(\nu)$ have values near 1. These average spectral transmission values $\overline{T}_1$ and $\overline{T}_2$ may be larger by orders of magnitude than in cases where partial light fluxes $I_1$ and $I_2$ are generated by merely filtering off one single line of spectral width $\delta\nu$ from a basic spectrum.

Finally it is of particular advantage that filters 15 and 18 having spectral transmission characteristics as represented in FIG. 2(b) may be constructed in a relatively simple manner as interference filters as will be explained hereinafter in more detail.

To more fully explain the circumstances occuring in practice when working according to the encoding method according to the invention, the following example is discussed.

A gallium-arsenide luminescense diode is used as a light source for emitting light with a mean optical frequency (wave number) $\nu_o = 12{,}000$ cm$^{-1}$, which corresponds to about a wavelength of 0.83 $\mu$m. The bandwidth $B\nu$ of the emission spectrum of such a luminescence diode has a typical value of 400 cm$^{-1}$. In any case, conditions of equations (1) and (2) are fulfilled with sufficient certainty if line-separations of 40 cm$^{-1}$ and line-widths $\delta\nu$ of 2 cm$^{-1}$ are used. In practice this may be achieved by using interference filters of an order $m = 300$ and of a "finesse" $F = 20$. Carrying out the encoding method explained so far is possible in different manners which, with respect to fiber optic sensor systems 100 and 100' as shown in FIGS. 3 and 4, respectively, will be explained hereinafter in more detail.

With respect to the transducers 11, which may be of identical design, within sensor systems 100 and 100' respectively, it is assumed at first that the light fluxes $I_1$ and $I_2$ guided to and from the transducer 11 by optical fibers 12 and 13 are transmitted in different degrees in such a manner, that the transmission ratio $\overline{T}_1/\overline{T}_2$ is representative of the momentary value of the measurant x. When proceeding according to the preferred method as illustrated by the sensor system 100 of FIG. 3, the two light fluxes $I_1$ and $I_2$ are generated by dividing a primary light flux I which is emitted by the light source 14. In this manner, fluctuations of the output power of this light source have no influence on the indication of the measurant.

The encoding method illustrated by the fiber optic sensor system 100' of FIG. 4 may be interpreted as reversion or inversion of the method illustrated by FIG. 3, insofar as in FIG. 4, both light fluxes $I_1$ and $I_2$ have equal optical powers at a common detector 35 of an evaluation unit 10', but have differently modified optical powers when coupled into the optical fiber 12 leading from a light supply unit 14' to the transducer 11, in correspondence with the reciprocal value of the previously explained transmission ratio. To this object, within the light supply unit 14', two separate light sources 30 and 31 of substantially equal design are provided, the output powers of which are controllable by electronic elements 32 and 33, respectively. A pair 18 of filters, which compared with fiber optic sensor system 100 of FIG. 3, is used here in the reverse direction, and filters out the light fluxes $I_1$ and $I_2$ from the output light fluxes of the light sources 30 and 31, respectively, leaving just the interspersed spectral distribution of the light powers characteristic of the light fluxes $I_1$ and $I_2$. These light fluxes $I_1$ and $I_2$ are then also spatially recombined and then coupled into the optical fiber 12 leading from the light supply unit 14' to the transducer 11. The required equality of the optical powers of the light fluxes $I_1$ and $I_2$, which are guided through the second optical fiber 13 from the transducer 11 to the evaluation unit 10', is achieved at the output end of this oPtical fiber 13 by alternatingly switching the light sources 30 and 31 on and off by means of a clock; the two light fluxes $I_1$ and $I_2$ after being transmitted through the total optical system is then received by the common detector 35. With the light fluxes $I_1$ and $I_2$ having equal optical powers, the output signal of the detector 35 is a d.c. signal which is constant in time. If the optical powers of the two light fluxes $I_1$ and $I_2$ differ from each other, the detector 35 generates an a.c. signal which, after amplification and synchronous rectification by means of an amplifier 36 acting in the manner of a lock-in amplifier, is fed as an error-signal to a control unit 37 influencing the electronic control elements 32 and 33 in such manner that the required equality of optical powers of the two light fluxes $I_1$ and $I_2$ is obtained at that end of the optical fiber 13 which is arranged near the detector 35. The previously explained control of the light sources 30 and 31 may be obtained by controlling the output light power of these light sources. On the other hand, it is possible to vary the pulse durations of the individual light sources 30 and 31 for which within each of one of the subsequent pulse-periods of the clock oscillator 34 the light sources 30 and 31 are alternatingly switched on and operating at a defined output power. Using this kind of control of the light sources 30 and 31, the required equality of the optical powers or intensities, respectively, of the light fluxes $I_1$ and $I_2$ when received at the detector 35, is obtained by varying the energies of the light fluxes emitted within one clock-period by the individual light sources 30 and 31. From the thereby resulting ratio of the control signals by which the intensities of the output light fluxes of the light sources 30 and 31, or their durations of emission, respectively, are controlled, the electronic unit 21' calculates the transmission-ratio $\overline{T}_1/\overline{T}_2$ of interest and effects also a measurant indication by means of the indication instrument 22, in the case of necessity in consideration of a calibration-function which has been determined before. It should be noted, that even when using the method explained with respect to FIG. 4, the measurant is finally determined from the optical power ratio of the light fluxes $I_1$ and $I_2$ at the output end of the optical fiber 13 even if this ratio—after the response time of the described control circuit of FIG. 4—has the value 1.

Transducers suitable for use within fiber optic sensor systems 100 and 100' as schematically illustrated in FIGS. 3 and 4, may be realized substantially according to four different principles which in a manner suited for a systematic comparison are schematically illustrated in FIGS. 5-8, to the details of which reference is made.

The transducer 11 shown in FIG. 5 corresponds to that shown in FIG. 1: a light flux I having a spectral composition determined by the emission characteristics of the light source 14 and being fed through the optical fiber 12 to the transducer 11 is divided by means of a pair 15 of filters into the light fluxes $I_1$ and $I_2$, which, within the transducer 11 are subjected to modulation in dependence on the measurant x, recombined by the beam-recombination unit 16 and coupled into the optical fiber 13 leading to the evaluation unit 10. It is of importance here that the modulation is acting in different manners on the light fluxes $I_1$ and $I_2$. In FIG. 5, this is illustrated by an attenuation filter 17 with position-dependent transmission, a so-called neutral wedge filter. Alternatively thereto, an aperture which, in dependence on the measurant is shiftable in a direction transverse to the direction of light propagation, could be used for the purpose of modulation or any other of known devices by which the desired attenuation of a light flux can be achieved. Whereas in the transducer 11 according to FIG. 5, only one light flux—the light flux $I_1$—is modulated, it is deemed to be more advantageous to modulate the other light flux $I_2$ as well; the latter, however, in a sense opposite to the modulation of the light flux $I_1$, i.e. in a manner that any decrease of intensity of the light flux $I_1$ is related with a corresponding increase of intensity of the other light flux $I_2$. The separation of the light fluxes $I_1$ and $I_2$ required for such a modulation within the transducer 11 is schematically illustrated in FIG. 5 as a spatial separation.

It is understood, however, that any other methods providing for a separation of two light fluxes might be used, e.g. a separation with respect to the directions of propagation of the two light fluxes $I_1$ and $I_2$ or with respect to different states of polarization thereof; the two last mentioned possibilities offering the advantage that both light fluxes $I_1$ and $I_2$ may propagate within one and the same optical path, whereby insuring optimal equality of all losses caused by borders of apertures or scattering reflections to which the light fluxes $I_1$ and $I_2$ are subjected.

As a beam-recombination unit 16 numerous well-known devices are suited, e.g. fiber optic Y-couplers, partially transmissive mirrors, or the like, which otherwise are used as beamsplitters operating by wave front- or amplitude-division. If the light fluxes $I_1$ and $I_2$ which are to be recombined, e.g., to be coupled into the optical fiber 13, have distinctly different polarization states, it is also possible to use as a beam-recombination element 16 an analyzer which is transmissive of an intermediate state of polarization.

In the modification of a transducer 11 suited for use within a fiber optic sensor system 100 or 100' as shown in FIGS. 3 and 4, respectively, in distinction from the transducer according to FIG. 5 which comprises a fixedly adjusted beam-recombination unit and a separately arranged modulator 17, a beam-recombination unit 16 controlled in dependence on the measurant x is provided which provides here for both the modulation and beam-recombination functions. By the modulator 16 of the transducer 11 according to FIG. 6, larger or smaller fractions of the optical power of the light flux $I_1$ and complementary fractions of the optical power of the light flux $I_2$ are coupled into the optical fiber 13 leading from transducer 11 to an evaluation unit 10, not shown. This kind of beam-recombination in combination with intensity modulations of the light fluxes $I_1$ and $I_2$ in opposite senses, may be realized e.g. by means of a shiftably arranged lens or, if the light fluxes $I_1$ and $I_2$ have distinctly different states of polarization, by means of a polarization-analyzer which is adjustable in dependence on the measurant x. In FIGS. 7 and 8, additional advantageous designs of transducers 11 are illustrated which provide for characteristically different modulations of the intensities of partial light fluxes $I_1$ and $I_2$—variations with respect to each other—which are required for a suitable encoding of the measurant x. From FIGS. 5 and 7, it may be recognized that the transducer of FIG. 7 may be derived from that of FIG. 5 by an exchange of the succession of the pair 15 of filters and of the beam-recombination unit 16 with respect to the direction of propagation of the partial light fluxes $I_1$ and $I_2$, with the element 16 which was used as a beam-recombination element in FIG. 5, now being used according to FIG. 7 as a beamsplitting element.

The same holds, substantially, for the transducer illustrated in FIG. 8 which may be derived from a transducer as shown in FIG. 6 by the corresponding exchange of direction of propagation of the light fluxes $I_1$ and $I_2$, with successively arranged optic elements 16 acting as a measurant controlled beamsplitter and pair 15 of filters acting in FIG. 8 as a beam-recombination element.

Figure 9:
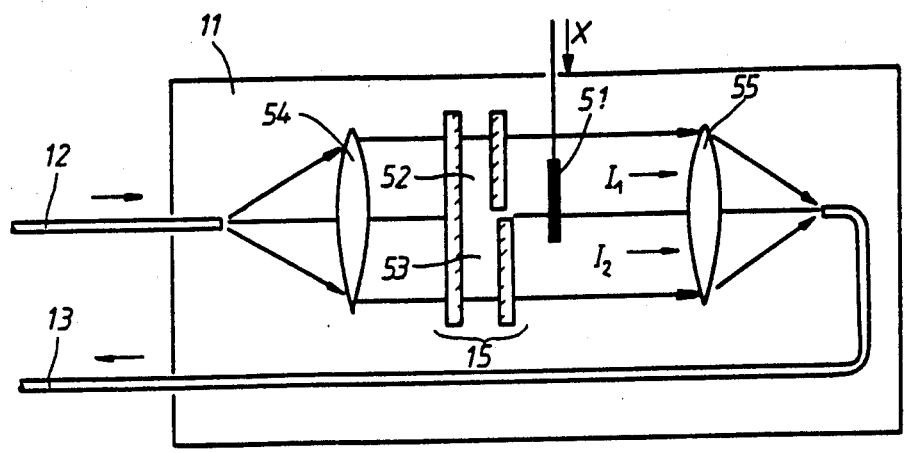
FIG. 9 and FIG. 10 show transducers with pairs of filters which define the spectral composition of the partial light fluxes $I_1$ and $I_2$, provided with shiftable stops as modulators.
Figure 10:
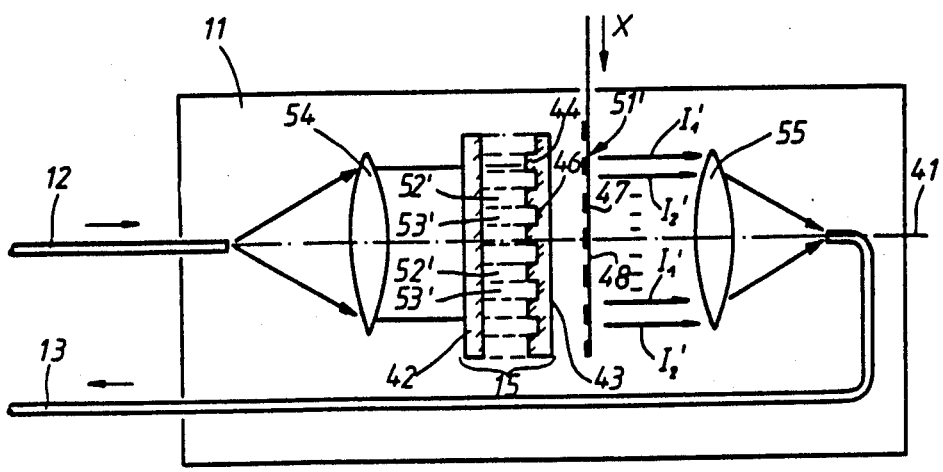

For the purpose of a more precise explanation of suitable modulation-methods, reference is now made to the details of FIGS. 9 and 10 illustrating transducers within which the intensities of partial light fluxes $I_1$ and $I_2$ are modulated in opposite senses by shifting a stop 51.

According to FIG. 9 the light flux I which is transmitted through the optical fiber 12 to the transducer 11 by means of a collimation-lens 54 is directed to a pair 15 of filters which consists of two interference filters 52 and 53, each being of the type of a Fabry-Perot-Interferometer. These interference filters 52 and 53, each having transmission characteristics with spectrally equidistantly spaced narrow-width transmission bands, are filtering out the light fluxes $I_1$ and $I_2$ which, according to the invention, have narrow-widths line-shaped spectral distributions of the optical powers, and which, according to FIG. 9, are propagating side by side through spatially separate parts of the total light flux cross section.

The stop 51, depending upon its position, is blocking more or less extended parts of the partial light flux cross sections allocated to the two light fluxes $I_1$ and $I_2$, as illustrated in FIG. 9. A shifting of the stop 51 in response to the measurant x, e.g., in the direction of the arrow of FIG. 9 and transverse to the direction of propagation of the partial light fluxes $I_1$ and $I_2$, results in an increase of the fraction of the partial light flux $I_1$ and in a corresponding decrease of the fraction of the partial light flux $I_2$ which are transmitted through the transducer 11. It is understood, that the width of the stop 51, measured in the plane of the drawing must be suitably selected, preferably equal to the transverse "width" of the partial light flux cross sections of each of the light fluxes $I_1$ and $I_2$. The recombination of the transmitted fractions of the partial light fluxes $I_1$ and $I_2$, which by means of the interference filters 52 and 53 the mutually interspersed narrow-width line-shaped spectral structures are imparted, is achieved by a positive lens 55 which focuses the two partial light fluxes $I_1$ and $I_2$ or the fractions thereof respectively which are not being blocked by the stop 51, onto the near input end of the optical fiber 13 leading to an evaluation unit, not shown, thereby, coupling these partial light flux fractions into this optical fiber 13. An advantage of this simultaneous modulation of the partial light fluxes $I_1$ and $I_2$ in the opposite sense is that the ratio $I_1/I_2$ of their optical powers used for evaluation is changing twice as fast in dependence on a displacement of the stop 51 than compared with the case where only one of the partial light fluxes I₁ or I₂ is modulated.

In the embodiment according to FIG. 10, the same modulation principle is used as just described with respect to FIG. 9, namely to modulate spectrally interspersed partial light fluxes $I_{1'}$ and $\bar{I}_{2'}$ by means of a transversely shiftable stop or aperture 51', the spectral composition of these partial light fluxes $I_{1'}$ and $I_{2'}$ again being defined by interference filters 52' and 53' each of which are constructed in the fashion characteristic for a Fabry-Perot-Interferometer. Regarding the transducer 11 according to FIG. 10 in the direction of a displacement x which is to be measured, e.g, transversely with respect to the direction of light propagation, this transducer 11 contains in an alternating sequence, interference filters 52' of a first kind and interference filters 53' of a second kind. Therefore, a spatially interspersed arrangement of filters 52' and 53' results, wherein all interference filters 52' have the same transmission characteristics, which define the spectral composition of the partial light fluxes $I_{1'}$ and all filters 53' have also identical transmission characteristics—different from those of filters 52'—defining the spectral composition of the partial light fluxes $I_{2'}$. In this way all light fluxes $I_{1'}$ and $I_{2'}$ have the same spatially interspersed arrangement as the filters 52' and 53', respectively. In the embodiment of FIG. 10, like in that one of FIG. 9, the interference filters 52' and 53', which correspond in their function to the pair 15 of filters, are arranged between a collimating lens 54 and a positive lens 55, the latter acting as a beam-combiner. The transducer 11 according to FIG. 10 has the advantage that a possible misalignment of the collimating lens 54 cannot cause disturbing imbalances of the illumation of the interference filters 52' and 53'; such imbalances would normally be indistinguishable from variations of the measurant x. In the embodiment of FIG. 10, the partial filters 52' and 53' have the form of narrow, interspersed stripes. Equivalently, they could be sector shaped and azimuthally interspersed when considered with respect to the central axes 41 of the transducer. If, in either case, the arrangement of the interspersed filters 52' and 53' is such that a considerable number of partial filters of either kind 52' and 53' is used simultaneously (typically not less than five filters), then, the effect of any possible misalignment is greatly reduced. A particular advantage of the two arrangements of the partial filters 52' and 53' mentioned above in connection with FIG. 10 is that they can be manufactured in fairly simple ways.

If only two interference filters 52 and 53 are used as in the embodiment of FIG. 9, they must be prepared in such a manner that the maxima of transmission of the first filter 52 defining the spectral position of the lines of the light flux I₁ coincide with the minima of transmission of the other interference filter 53 as shown in FIG. 2(b).

In order to guarantee that these conditions are satisfied sufficiently well over the entire spectral range Bν of the light source, it is necessary, that the interference orders of the partial filters 52 and 53 differ from each other by half an order or by an odd multiple of half an order at some mean optical frequency $\nu_o$. If such partial filters 52 and 53 were prepared separately, it would be necessary to control the separation of their reflectors with a very high accuracy in order to ensure satisfaction of the mentioned conditions.

With the embodiment according to FIG. 10, however, an advantageous possibility to realize the partial filters 52' and 53' in a simple manner is to form these filters from two partially transparent reflectors 42 and 43, wherein at least one of these two reflectors which is designated in FIG. 10 by 43, is designed to have stripe-shaped areas of its reflecting surface reflecting light with a different phase of reflection than in interspersing stripe-shaped areas. This can be achieved, e.g., by etching flat grooves having a depth of $\lambda_o/4$ (or an odd multiple thereof) into the surface of the reflector 43, thereafter, this surface being coated with a partially transmissive reflection layer which covers the entire reflecting surface. In this expression, $\lambda_o$ designates the average wavelength correlated with the average optical frequency $\nu_o$ according to FIG. 2. Another possibility equivalent hereto consists in the following. After depositing the reflection layer, the stripe-shaped areas of the reflector surface are covered with a transparent layer of the thickness $0.25 \lambda_o/(n-1)$, where "n" is the refractive index of this layer, and the term (n-1) designates the optical retardation of the light in the coated stripes relative to the interspersed stripe-shaped areas which are not coated.

The described methods for a modification of the phase of a reflection by which light is reflected at the various stripe-shaped areas, are valid for the case that the reflection layers are deposited on substrates which are arranged outside of the resonant volume of the Fabry-Perot-Interference filter, e.g., the reflection layers are deposited on the inner surfaces of the reflectors 42 and 43, facing each other. Modifications of these structures which are necessary in the case where the reflecting layers are to be deposited on the opposing surfaces of a single transparent substrate, e.g., on the two surfaces of a plate of fused quartz which then forms the resonant volume of the partial filters 52' and 53', are deemed to be possible for anyone with the ordinary skill in the art. In the transducer 11 according to FIG. 10, the partial filters 52' are formed by protruding stripe-shaped areas 44 of the reflector 43 and by that surface areas of the flat reflector 42 which are facing the protruding stripes 44, whereas the partial filters 53' are formed by recessing, stripe-shaped areas 46, interspersed between the protruding stripe-shaped areas 44, and by that surface area of the flat reflector 42 which faces those recessed stripes 46. The combination of all partial filters 52' of FIG. 10 corresponds to the filter 52 shown in FIG. 9. In the same sense, the combination of all partial filters 53' of FIG. 10 corresponds to filter 53 of FIG. 9. Similarly, the combination of all partial light fluxes $I_{1'}$ whose spectral composition is determined by the partial filters 52', corresponds to the partial light flux I₁; and the combination of all partial light fluxes $I_{2'}$ whose spectral composition is determined by the partial filters 53' corresponds to the partial light flux I₂ in the transducer 11 according to FIG. 9.

In accordance with the stripe-shaped structure of the filter arrangement 52', 53' of the transducer 11 according to FIG. 10, the transversely movable aperture 51' is designed in this case to have a stripe-shaped structure, too, consisting of alternating opaque stripes 47 and interspersed transparent stripes 48. The modulation of the partial light-fluxes $I_{1'}$ and $I_{2'}$ by a stripe-shaped aperture 51' as shown in FIG. 10 is particularly well-suited for transducers which primarily encode a transverse geometrical displacement x.

If a sector-shaped design of the partial filters 52' and 53' and an azimuthal arrangement thereof around the central axes 41 of the transducer 41 and a correspondingly sector-shaped design and azimuthal arrangement of the opaque and transparent parts of the aperture 51' are provided and the aperture is rotatable around the axis 41, such as transducer is well-suited for measurement of rotation-angles. Transducers of this kind may be used in a known manner also for measurements of other physical quantities.

If, for example, in a transducer 11 according to FIG. 10 the transverse shift of the aperture 51' occurs against the restoring force of a linear spring, the transducer 11 of FIG. 10 is well suited as a force-sensor. If a rotary movement of a sector-shaped aperture in a transducer having sector-shaped and azimuthally interspersed interference-filters, occurs against the restoring force of a torsion spring, then such a transducer which is primarily suited for measurements of rotation-angles, is well-suited as a torque-sensor.

Correspondingly numerous sensors may be used for measuring quantities such as temperature, pressure, electric or magnetic fields, derived from expansion bodies, diaphragms, piezo-electric bodies or magnetostrictive bodies, by which measurant-proportional deformations corresponding to displacements of modulating elements such as apertures or the like can be controlled.

Figure 11:
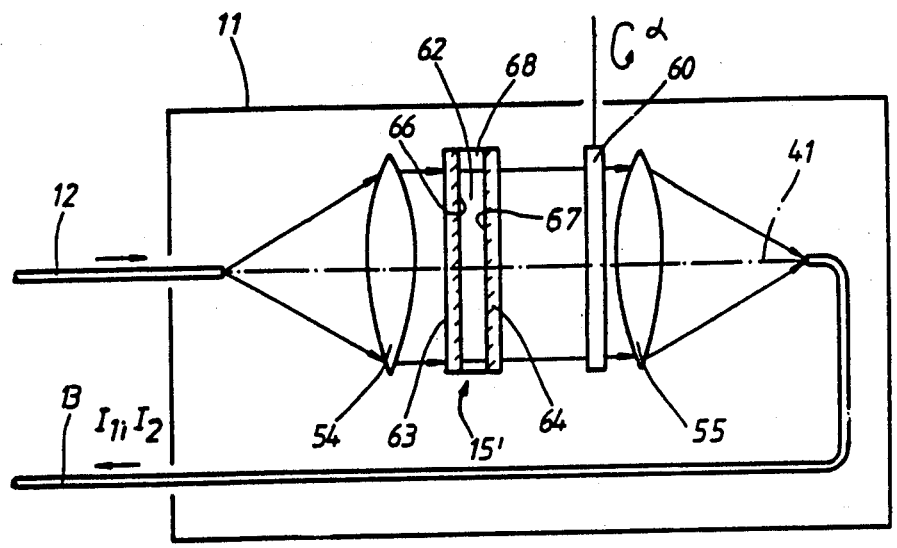
FIG. 11 and FIG. 12 show polarization dependent transducers for dividing a primary light flux into the partial light fluxes $I_1$ and $I_2$ and polarization-dependent modulators, the transducers according to FIGS. 5-12 being designed for use in the transmission mode.

In the transducer 11 according to FIG. 11, to the details of which reference is now made, a pair 15' of filters which is functionally equivalent with the previously described pairs 15 of filters comprising partial filters 52 and 53, or 52' and 53', respectively, is realized by means of one simple constructive element consisting of an interference filter of the kind of a Fabry-Perot-Interferometer. This interference filter 15' is arranged between a collimation-lens 54 and a positive lens 55 as just described with reference to FIGS. 9 and 10 with respect to the pair 15 of interference filters 52 and 53, and with respect to the interference filter-combination 52', 53', respectively. Partially transmissive reflectors 63 and 64 which delimit the resonant volume have plane and parallel reflection surfaces 66 and 67. The resonant volume 62 extending between these reflection surfaces 66 and 67 contains a plate-shaped body 68 consisting of a transparent, birefringent material. The thickness of the birefringent body 68, regarded in the direction of light propagation, determines the separation of the reflecting surfaces 66 and 67, and is chosen in such a manner that for two mutually orthogonal states of polarization of a light flux passing through the birefringent body 68, one polarization state is retarded relative to the other by about one quarter of the mean wavelength of the light fluxes. The birefringent body 68 with these dimensions, then, forms a quarter-wavelength-plate. The consequence thereof is, that the birefringent body 61 and the reflection layers 66 and 67 arranged at the outside form an interference-filter whose transmission characteristics, related with each one of the two orthogonal states of polarization, just differ by half an interference order as depicted in FIG. 2(b).

It is understood, that instead of a birefringent body 68 exhibiting a retardation of one quarter-wavelength for orthogonal states of polarization, a birefringent body could be used exhibiting a retardation of an odd multiple of a quarterwavelength. The combination of two Fabry-Perot-interference filters to a single filter with orthogonal polarization-eigenstates can be achieved by using either a birefringent body 68 exhibiting a linear birefringence, or by using a body 68 exhibiting a circular birefringence, the polarization-eigenstates, then, corresponding to these polarizations.

The practically most simple case of linearly polarized eigenstates can be achieved even without using birefringent materials in that at least one of the reflectors 63 or 64 of the interference filter 15' is designed in such a manner that the phase of reflection—supposed normal incidence (at right angles)—becomes polarization—dependent. This may be realized, for example, by depositing on this reflector a dielectric or metallic relief-laminar-grating, with the grating constant being smaller than the wavelength of the light used for transmitting the measurant information. The grating structure and the grating constant of those laminar-gratings are to be chosen in such a manner that the difference of the phases of reflection of light which is polarized parallel, and perpendicular to the grating stripes, respectively, has a total value of 180 degrees, in order to ensure that the spectral displacement of the transmission characteristics effective for the two polarization states are differing by half an interference order or an odd multiple thereof. If both reflectors 63 and 64 of the interference-filter 15' are provided with such laminar-gratings, then, it is possible to choose a design of these gratings of that kind that each of these gratings contributes by, for example, 90 degrees to the total difference of the phases of reflection.

For a further explanation of the kind of modulation which may be performed by means of the transducer 11 according to FIG. 11, it be assumed, that the interference filter 15' has two eigenstates of linear polarization, one of which being parallel and the other perpendicularly oriented with respect to the plane of drawing. According thereto the partial light fluxes $I_1$ and $I_2$ emerging from this filter 15' have polarizations linear and parallel to these directions; the partial light fluxes $I_1$ and $I_2$, however, are not spatially separated but propagate commonly within the same spatial region and in the same direction. To a modulation of these partial light fluxes $I_1$ and $I_2$ in an opposite sense, a linear polarization analyzer 60 is provided, which is arranged between the interference filter 15' and the Positive lense of transducer 11. This analyzer 60 being adjusted to an azimuth $\alpha$ with respect to the plane of drawing, only the fractions $\cos^2\alpha$ and $\sin^2\alpha$, respectively of the two partial light fluxes $I_1$ and $I_2$ are transmitted, and thereby the azimuthal orientation is encoded into the power-ratio of these light fluxes. The transducer 11 shown in FIG. 11, therefore, is primarily suited for fiber-optic angle-measurements. The measurement of numerous other physical quantities may be performed as just mentioned, by combinations with measurant-sensitive converter-elements.

Figure 12:
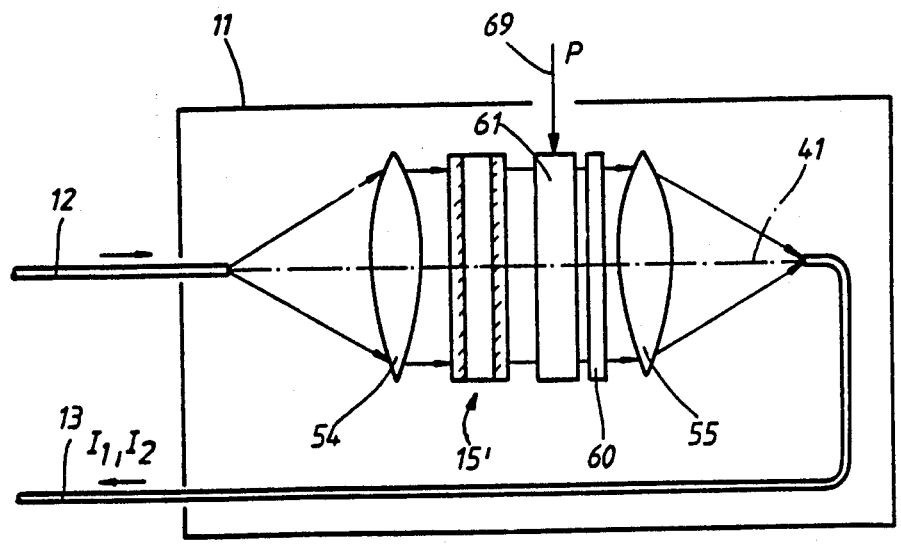

The transducer 11 according to FIG. 12, to the details of which reference is now made, is primarily suited for measurements of forces. It distinguishes from the transducer according to FIG. 11, substantially in that between the interference filter 15' and the analyzer 60, an elasto-optic element 61 is arranged, which, through the influence of a force acting in a defined direction exhibits a birefringence. The direction of the force and the arrangement of this elasto-optic element 61 is preferably chosen in such a manner that the axes of birefringence have azimutal orientations of 45 degrees when the force is acting, the analyzer being advantageously fixedly adjusted to an azimuth =0. In the case where, no force is acting and that the elasto-optic body 61 does not exhibit a birefringence, the two orthogonally polarized light fluxes are not influenced, resulting in one of the partial light fluxes, e.g., the light flux $I_1$ can pass the analyzer 60 without being attenuated while the other partial light flux $I_2$ is blocked. When a force P is acting on the elasto-optical body 61 in the direction of arrow 69, both partial light fluxes $I_1$ and $I_2$ are more and more eliptically polarized, thereby resulting, that the one partial light flux $I_1$ is more and more attenuated, whereas the other partial light flux $I_2$ passes in an increasing amount by the analyzer. When the strength of the force is sufficient to cause within the elasto-optic body 61 a phase retardation of $\pi$, then the partial light flux $I_1$ is completely blocked and the partial light flux $I_2$ is completely passed. The transducer 11 according to FIG. 12, therefore, is well suited to encode a force P into the ratio of the optical powers of partial light fluxes $I_1$ and $I_2$ of different polarizations.

In the alternative types of fiber optic sensor systems 100, 100', respectively, as shown in FIGS. 3 and 4 and described with reference thereto, the transducers 11 contained therein are operated in transmission; the consequence thereof is that a first optical fiber must be provided through which the output light fluxes of a light source 14 or of a light supply unit 18, 30, 31 may be directed to the transducer 11, and a second optical fiber 13, through which partial light fluxes $I_1$ and $I_2$ of distinctly different spectral composition are guided to the evaluation unit 10 or 10', respectively, which enables an evaluation of this intensity ratio $I_1/I_2$ containing the measurant-information in units of the measurant.

Figure 13:
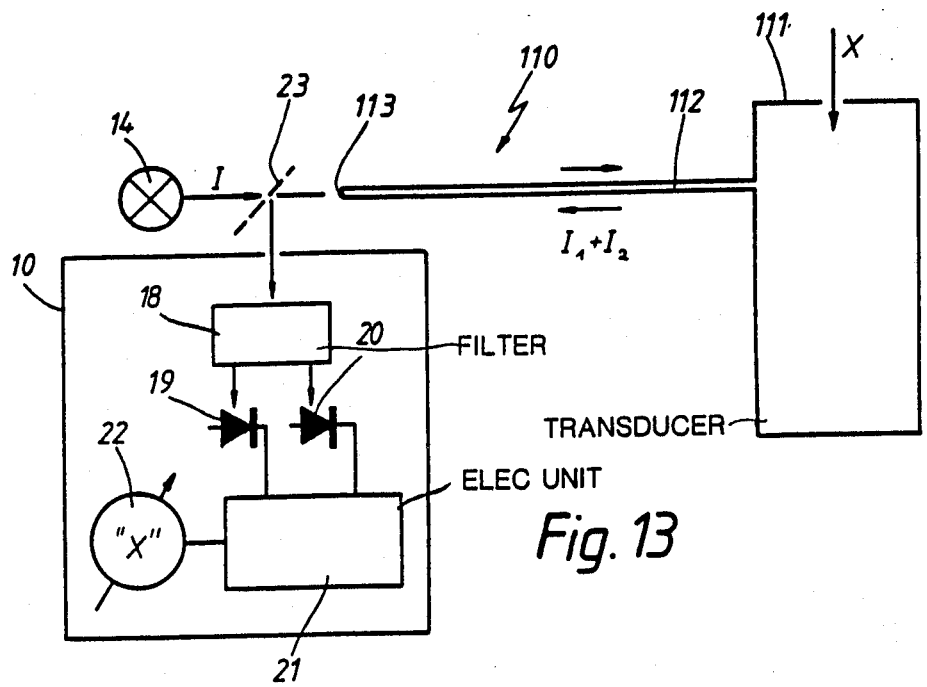
FIG. 13 and FIG. 14 show alternative embodiments of fiber optic sensor systems adapted to an operation in the reflection mode.
Figure 14:
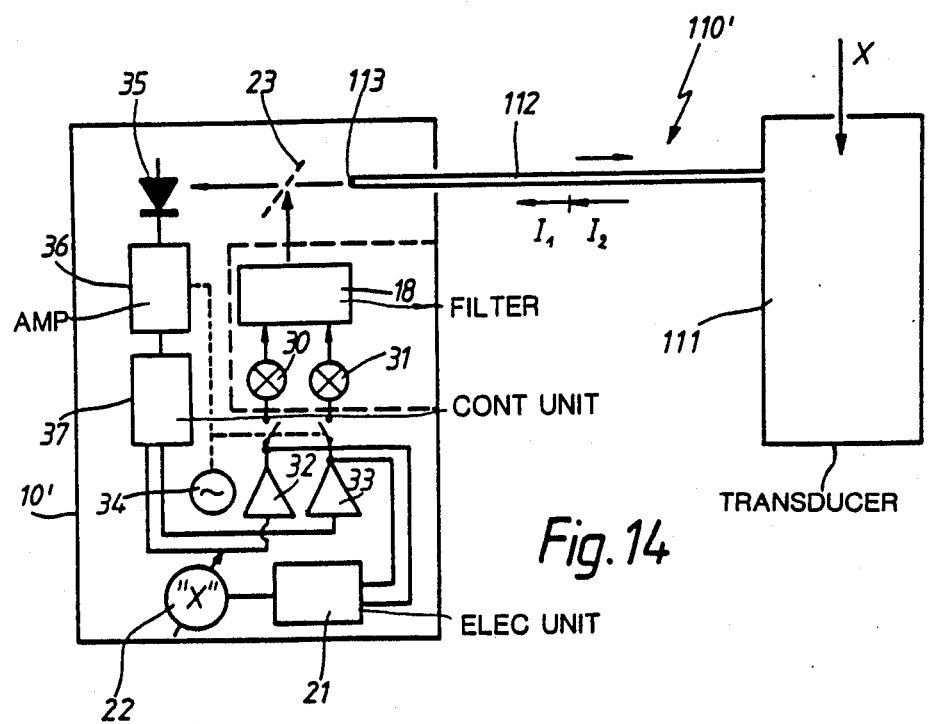

Alternatively to such fiber optic sensor systems 100 and 100', respectively, as an arrangement performing the method according to the invention, fiber optic sensor systems 110 or 110', respectively, may be used which are shown in FIGS. 13 and 14, details thereof following. These sensor systems are provided with transducers which may be operated in the reflection modus and which can be realized in the basic structures according to FIGS. 15 to 20, the details of which also following.

Regarding FIGS. 13-20, reference numerals are used which are identical with reference numerals as used in FIGS. 1-12, such reference being intended to include also the respective parts of the description so that the description of the fiber optic sensor system 110 and 110', respectively, shown in FIGS. 13 and 14 as well as the description of transducers 111 as shown in FIGS. 15-20, substantially, may be restricted to the functional Properties of the depicted devices and to a comparison thereof with the previously described, functionally analogous arrangements or elements.

Between the light source 14 or the light supply unit 18, 31, 30, on the one hand, and the transducer 11, on the other hand, the fiber optic sensor systems 100 and 100' as shown in FIGS. 3 and 4, respectively, have an optical input interface, at which that end of the first optical fiber 12 which is arranged near the transducer 11 may be interpreted, and between the transducer 11 and the evaluation unit 10 or 10', respectively, an optical output interface at which that end of the second optical fiber 13, leading from the transducer 11 to the evaluation unit 10 or 10', respectively, may be interpreted which is arranged far from the transducer 11. The fiber optic sensor systems 100 or 110, respectively, as shown in FIGS. 13 and 14, however, have only one common optical input-output-interface which is arranged between the light source 14 or light supply unit 18, 30, 31 and the transducer 111, on the one hand, and also between the transducer 111 and the evaluation unit 10 or 10', respectively, on the other hand. This optical interface is formed by one end 113 of one common optical fiber 112 through which light is coupled into the transducer, as well as partial light fluxes $I_1$ and $I_2$ which had been subjected to an intensity modulation within the transducer are coupled out from the transducer towards the evaluation unit 10 or 10', respectively. The interface fiber end 113 is that end of the fiber 112 which is arranged furthest from the transducer 111. The partially transparent mirror 23 which is arranged in a manner well known per se provides an optical "decoupling" of the input and output functions of the input and output interface 113. In the embodiment according to FIG. 13, a primary light flux I emerging from the light source 14 is partially transmitted through this mirror 23 and coupled into the optical fiber 112. Partial light fluxes $I_1$ and $I_2$ emerging from the transducer 111, and thereafter, emerging at the fiber end 113 are directed by the partially transparent mirror to the evaluation unit 10 which is evaluating the measurant information encoded into the intensity ratio $I_1/I_2$ of the partial light fluxes, in units of the measurant.

In the embodiment according to FIG. 14, spectrally interspersed partial light fluxes $I_1$ and $I_2$ emerging from the light supply unit 18, 30, 31 are directed by the partially transparent mirror 23 to the immediately neighboring fiber 113 and coupled into the optical fiber 112, whereas partial light fluxes $I_1$ and $I_2$ emerging from the transducer 11 partially pass through the partially transparent mirror 23 and propagate to the detector 35 of the evaluation unit 10'. The desired information or indicating signals are generated from the intensity ratio of the partial light fluxes $I_1$ and $I_2$ into which the measurant information is encoded. These structural and functional properties of the fiber optic sensor devices according to FIGS. 3 and 4, and FIGS. 13 and 14, respectively, are some of the basic distinctive features, with further explanations regarding the special embodiments of transducers 111 suited for a use in the reflection mode and shown in FIGS. 15-20 being discussed below.

Figure 15:
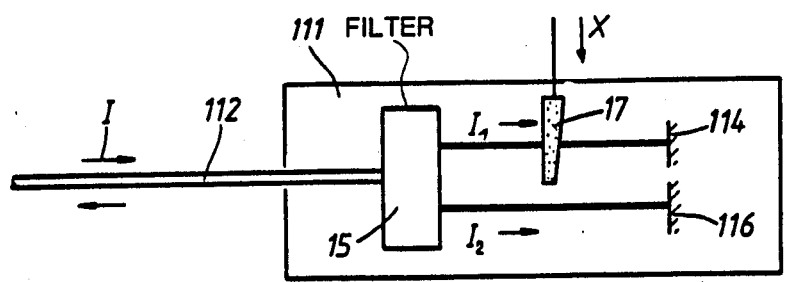
FIG. 15 to FIG. 17 show the basic structures of transducers adapted to the reflection mode.

In the transducer 111 according to FIG. 15, a pair of filters 15 is used to form a spectral subdivision of a primary light flux I, emitted for example by a light source 14, into the two spectrally interspersed partial light fluxes $I_1$ and $I_2$, as well as to recombine these partial light fluxes after having been reflected at individually allocated reflectors 114 and 116 in the reverse direction. At least one of these partial light fluxes, e.g., the partial light flux $I_1$, is subjected within the transducer 111 to an intensity modulation in dependence on the measurant x, by means of a neutral wedge filter 17 or by means of stops or apertures. Although the transducer 111 of FIG. 15 is designed as a reflection unit, it is quite similar to the transducer 11 according to FIG. 7.

Figure 16:
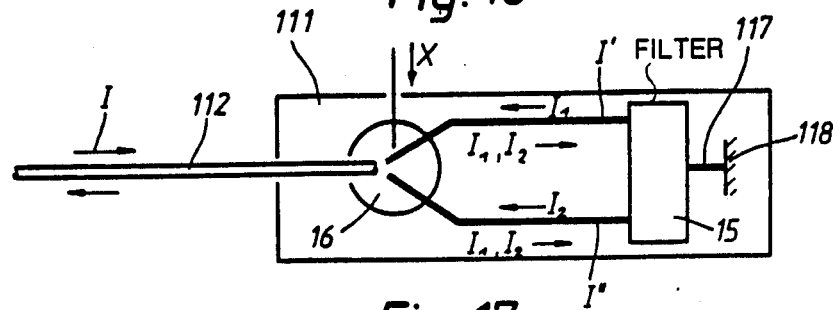

The transducer 111 shown in FIG. 16, may be compared according to its construction and function with the transducers 11 according to FIGS. 6 and 8 which are adapted to the transmission mode.

The modulator 16 controls, in dependence on the measurant x, the splitting of a primary light flux $I_1$ into partial light fluxes I' and I'' which are passing twice through a pair 15 of transmission filters, once in the forward- and once in the backward-direction. A common arm 117 through which the partial light fluxes $I_1$ and $I_2$ are propagating in spectrally-interspersed composition, is closed by means of a reflector 118. The light fluxes I₁ and I₂ returning according to FIG. 16 in the "upper" and in the "lower" light path to the modulator 16 have, alternatively the spectral intensity distributions as defined by the partial filters of the pair 15. In the modulator 16 these light fluxes $I_1$ and $I_2$ are recombined in accordance with the partition ratio of this modulator and then coupled into the optical fiber 112.

Figure 17:
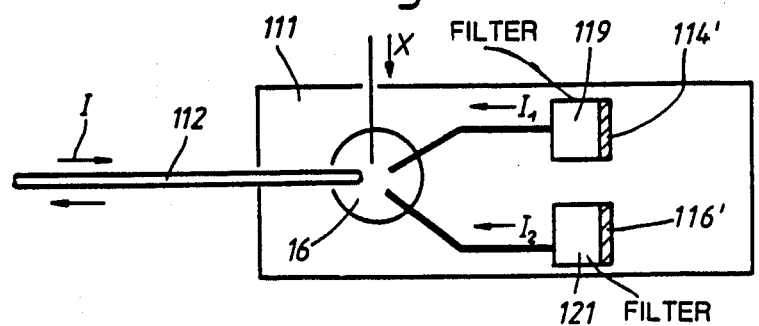

The transducer 111 according to FIG. 17 is quite similar to that shown in FIG. 16, however, instead of having a pair 15 of filters with a common arm 117, separated filters 119 and 121 are provided which impart to the partial light fluxes $I_1$ and $I_2$ returning to the modulator, the specific interspersed spectral line structure. These filters 119 and 121 are individually closed by a reflector 114' and 116', respectively, which are integrated into either one of the filters 119 and 121.

FIG. 18 shows a special embodiment of a transducer 111, the basic construction of which is shown in FIG. 17. A primary light flux, which from the optical fiber 112 is coupled into the transducer 111 is collimated by the lens 54. In dependence on the measurant x, a stripe-aperture 122 is shifted in the direction transverse with respect to the central axis 41 of the transducer 111 and provides in dependence on the measurant x, inverse variations of the intensities of the light fluxes propagating through the "upper" and "lower" parts of the total light flux cross section. To each of these spatial fractions, a reflection filter 119 and 121, respectively is provided for reflecting the incident light flux back into itself. In the special embodiment shown, the reflection filters 119 and 121 are designed as high order bragg-reflectors. Such a reflector consists of a large number (at least 5, normally 20 and more) of weakly reflecting partial reflectors 123 and 124, respectively, which, along the direction of propagation of the incident light are serially arranged in equal distances $d_1$ and $d_2$, respectively. If the distance of these reflectors, e.g. of the reflectors, 123 of the one reflection filter 119 is of the value $d_1$ and the refractive index of the material between these reflectors 123 is of the value $n_1$, the spectral separation $\Delta\nu$ of spectrally adjacent maxima of reflection (compare FIG. 2) is then represented by:

$$\Delta\nu = 1/(2n_1 d_1)$$

wherein $\Delta\nu$ is expressed in wave-numbers (cm$^{-1}$). The required spectral interspersing of the partial light fluxes $I_1$ and $I_2$ reflected by the reflection filters 119 and 122 is—assuming equal values of the refractive indices of the material between the reflectors 123 and 124 of the reflection filters 119 and 121—achieved by choosing different values of the distances $d_1$ and $d_2$ of the partial reflectors 123 and 124, respectively.

It is understood, that it is also possible, to achieve the desired reflection filter characteristics by realizing equal reflector-separations $d_1 = d_2$ and by arranging materials with different values of the indices of refraction between the reflectors 123 and 124, respectively.

In the transducer 111 according to FIG. 19, a primary light flux I is coupled from the optical fiber 112 into the transducer 111 and Converted by means of a collimation lens 54 into a parallel-bundle. This is then reflected back into itself by means of a reflection filter 126 also being designed as a bragg-reflector. The partial reflectors of this reflection filter 126 consist of a birefringent material. Light propagating in two different linear states of polarization both parallel and perpendicular polarization with respect to the plane of the drawing, is "seeing" different indices of refraction, thereby resulting in the partial light fluxes $I_1$ and $I_2$ of different polarizations, with the reflected fluxes generated by the reflection filter 126 having the required interspersed spectral composition. Between the reflection filter 126 and the collimation lens 54, a polarizer 128 is arranged which in dependence on the measurant is rotatable about the central axes of the transducer 111. This polarizer 128, by its azimuthal position which is varying in proportion to the measurant x, determines the transmission ratio of partial light fluxes of different orthogonal polarizations.

The functional properties of the transducer 111 according to FIG. 19 are quite similar to that of the polarization dependent transducer 11 according to FIG. 11.

In the transducer 111 according to FIG. 20, the polarizer 128 has a fixed azimuthal orientation (e.g., 45 degrees with respect to the plane of the drawing). Between the polarizer 128 and the reflection filter 126 which again is designed as a bragg-reflector, an elasto-optic body 129 is arranged which exhibits a birefringence in proportion to the measurant x, and thereby, enables a modulation of the polarization of light which is transmitted through polarizer 128. It is understood, that for the specially selected orientation of the polarizer 128 as stated above, the optical axis of the reflection filter 126 must also have a 45 degree-orientation with respect to the plane of drawing. The functional properties of the transducer 111 according to FIG. 20 are quite similar to those of the transducer 11 according to FIG. 12 and therefore, the transducer 111 of FIG. 20 is also primarily suited for measuring a pressure which is acting on the elasto-optic body 129.

It should be mentioned that within the ordinary skill of the art the described methods and embodiments of fiber optical arrangements may be combined, modified and/or improved in many ways. Devices used as filter elements in the transducers shown, e.g., in FIGS. 9–12, may be directly used as filters within the evaluation unit when instead of apertures correspondingly flux-deviating elements as mirrors or prisms are used or, when instead of polarization analyzers in transducers as shown in FIGS. 11 and 12, Wollaston prisms or other polarizers with two output light beams are used. For the purpose of suppressing cross-talk between the partial light fluxes $I_1$ and $I_2$, it may be suitable to use, instead of simple interference filters, a series connection of two or more of such interference filters or to use interference filters which have two or more resonant volumes coupled by partially transmissive reflection layers. Filter-combinations of this type have "broader" transmission-maxima and "deeper" transmission-minima.

What is claimed is:

1. A method for a fiber-optic transmission of the value of a spectrally encoded measurant representative of a variable physical quantity, from a transducer sensitive to that quantity, to an evaluation unit generating desired output signals which may be used for indication or for further processing, according to which method the optical power of at least a first flux $I_1$ is by means of the transducer, subjected to an intensity jodulation in a monotonous relation to the measurant, and the optical power of a second light flux $I_2$ used as a reference light flux, is by means of the evaluation unit, compared with said first light flux, whereby the desired output signal is generated as a signal characteristic of the power ratio of the two light fluxes, which by means of a fiber-optical arrangement are transmitted from the transducer to the evaluation unit, wherein both, the light flux $I_1$ and the light flux $I_2$ are transmitted from the transducer to the evaluation unit through one optical fiber forming the light path therebetween, wherein both partial light fluxes $I_1$ and $I_2$ are generated each with distinctly different narrow-band line-structures of the spectral distributions of their optical powers, in such a manner, that a line of one of the two light fluxes is spectrally interposed between two lines of the other light flux, with a spectral interspersing of the light fluxes $I_1$ and $I_2$ resulting therefrom, and the spectral separation of adjacent lines of these light fluxes being greater than the line-widths of those lines, and wherein the optical powers of the spectrally interspersed light fluxes $I_1$ and $I_2$, for the purpose of comparing these optical powers in the evaluation unit, are measured individually after spectral separation from each other by means of filters which are selective to the specific sppectral distributions of the light fluxes $I_1$ and $I_2$.

2. The method according to claim 1, wherein one of the light fluxes comprises an even number of spectral lines of significant optical power, and the other light flux of an odd number of spectral lines, and wherein each line of the one light flux consisting of the smaller number of lines is spectrally interposed between two adjacent lines of the other light flux consisting of the larger number of lines.

3. The method according to claim 1, wherein both light fluxes $I_1$ and $I_2$ are derived from a single light source, these light fluxes being separated in the evaluation unit by spectral filters and directed to individual detectors, and the value of the measurant is determined from the ratio of the two detector output signals.

4. The method according to claim 1, wherein the light fluxes $I_1$ and $I_2$ are generated by means of individual light sources of a light supply unit of filters individually allocated to said light sources, and are coupled into an optical fiber defining a light path optically connecting the light supply with the transducer; the light sources are alternatingly switched on and off, and the light fluxes $I_1$ and $I_2$ are fed through an optical fiber from the transducer and directed to a common optical rceceiver, the output signal of the receiver being an a.c. signal if the light fluxes $I_1$ and $I_2$ emerging from the transducer have different optical powers; from an a.c. output signal of the receiver, by rectification synchronous with the switching of the light sources, an error signal is derived and fed to a control unit generating two control signals by which the output optical powers of the two light sources are controlled such a manner that the optical powers of the output light fluxes emerging from the tranducer are adjusted to minimal power-difference, and the two control signals which are measured for the intensity ratio of the light fluxes emitter from the light sources are evaluated in terms of the measurement.

5. A method according to claim 1, including comparing the optical powers of the two partial light fluxes emerging from a transducer which is modulating at least one of said partial light fluxes in a manner characteristic of the measurant, and generating a signal which is characteristic of said measurant, said partial light fluxes $I_1$ and $I_2$ emerging from the transducer having narrow-band line-shaped spectrally interspersed intensity distributions which are generated by spectral separation of a primary light flux generated by one light source, such that a line of one of the two partial light fluxes is spectrally interposed between two lines of the other light flux, the two partial light fluxes emerging from the transducer being transmitted through an optical fiber to an evaluation unit which performs the comparison of their optical powers;

spectral separating the two spectrally interspersed partial light fluxes $I_1$ and $I_2$ to be comparted with each other from the primary output light flux of the light source by a first pair of filters in the transducer, and spectral separating and individually directing to an allocated one of two detectors light fluxes $I_1$ and $I_2$ emerging from the transducer by a second pair of filters in the evaluation unit.

6. A method according to claim 4, including comparing the optical powers of two partial light fluxes emerging from a transducer which is modulating at least one of said partial light fluxes in a manner characteristic of the measurant and generting a signal which is characteristic of said measurant, said partial light fluxes $I_1$ and $I_2$ emerging from the transducer having narrow-band line-shaped spectrally interspersed intensity distributions, which are generated by filtering of output light fluxes of two separate light sources in a manner that a line of one of the two partial light fluxes is spectrally interposed between two lines of the other partial light flux, the two partial light fluxes emerging from the transducer being fed through an optical fiber to an evaluation unit which performs the comparison of their optical powers, defining the spectral composition of the inuput light fluxes fed to the transducer where the measurant-characteristic modulations occurs by a first pair of filters;

and providing for a separate modulation of the light fluxes and for their common coupling into the optical fiber which optically connects the tranducer with the evaluation unit by a second pair of filters having the same filter characteristics of the first pair of filters;

generating signals characteristic of the optical powers of the transducer output light fluxes by a detector, which detector is optically coupled with the output end of the fiber;

in dependence on the output signal of a clock generator, the light sources are alternatingly switched on and off; a receiver unit is provided receiving the output signals of the detector and generating by rectification synchronous with the switching of the light sources, an error signal which is fed to a control unit designed to control the output optical powers of the light sources which are alternatingly switched on, in such a manner that the optical output powers of the light fluxes emerging from the transducer are adjusted to minimal power difference.

7. A method according to claim 5, wherein the first pair of filters is the input stage of a transducer separating the input light flux into the two partial light fluxes $I_1$ and $I_2$, at least one of which being modulated in the transducer;

the output stage of the transducer is a beam recombination unit which couples the two partial light fluxes into an optical fiber guiding the two partial light fluxes to the evaluation unit;

by a modulator between the pair of filters and the beam recombination unit, seen in the direction of light propapagation, is arranged, which, in modulating the optical power of at least one of the partial light fluxes $I_1$ and $I_2$ in dependence on the meausrant.

8. A method according to claim 7, wherein the modulator influences the optical powers of the two light fluxes in the opposite sense.

9. A method according to claim 5, by a beam splitter as an input stage of the transducer incoming light flux I is split into two partial light fluxes;

by a pair of filters as an output stage of the transducers, defining the spectral composition of the two partial light fluxes $I_1$ and $I_2$ which are guided to the evaluation unit, this pair of filters also acting as a beam recombination unit by which the two light fluxes are coupling into the optical fiber leading the evaluation unit.

10. A method according to claim 9, wherein influencing the optical power of at least one of the two partial light fluxes in dependence on the measurant is by a modulator arranged between the input stage and the output stage of the transducer.

11. A method according to claim 8, wherein the modulator influences the splitting ratio according to which optical power of the incoming light flux is distributed to the two partial light fluxes.

12. A method according to claim 5, wherein at least one of the pairs of filters consists of two transmission interference filters, and including selecting the spectral transmission characteristic of which at an average optical frequency of the light fluxes, to differ from each other by approximately an odd multiple of half an interfererence order.

13. A method according to claim 12, wherein the two interference filters are composed of at least two parallel partially transmissive reflectors having the total light flux cross section with about half of the reflecting surface of at least one of the reflectors reflecting the light with a phase of reflection which differs from the phase of reflection of the other half of the reflecting surface of said reflector by an odd multiple of $\pi/2$.

14. A method according to claim 13, wherein the modification of the phases of reflection at the reflector is achieved by depositing at least one thin dieletric layer on one of said halves of the reflecting surface of the reflector.

15. A method according to claim 13, including modulating the intensity of the transducer by an intensity modulate designed as a shiftable mask which, in dependence of the value of the measurant, is more or less blocking or clearing, respectively, parts of the total light flux cross section within which the partial light fluxes $I_1$ and $I_2$ are propagating.

16. A method according to claim 15, including subdividing the reflecting surface of the reflector which is reflecting with different phases of reflection into stripes of equal widths alternatingly reflecting the incident light with different phases of reflection, and the modulator comprises a mask shiftable at right angles to the longitudinal direction of the reflector surface stripes reflecting with different phases of reflection, said mask having a stripe-shaped structure with alternatingly arranged opaque and transparent stripes and corresponding to the stripe-structure of the reflector surface reflecting with different phases of reflection.

17. A method according to claim 12, including designing the pair of interference filters as a polarization-dependent interference filter which for a first defined state of polarization has a first spectral interference-filter transmission-characteristics and which for the state of polarization orthogonal to the first-mentioned state of polarization has a second interference-filter transmission characteristics which is different from the first transmission characteristics by an odd multiple of half an interference order.

18. A method according to claim 17, including selecting the two polarization-eigenstates of the polarization-dependent interference-filter as the two states of orthogonal linear polarization.

19. A method according to claim 17, including selecting for the resonant volume of the polarization-dependent interference-filter, a birefringent material exhibiting for the two light fluxes $I_1$ and $I_2$ of orthogonal states of polarization, after one passage through the resonant volume, a phase retardation which approximately corresponds to an odd multiple of a quarter of the average wavelength of the light fluxes.

20. A method according to claim 17, wherein at least one of the reflectors of the polarization-dependent interference-filter is selected to exhibit a polarization dependent of the phases of reflections occurring at this reflector, the total phase difference resulting from a reflection of light fluxes of orthogonal polarization states at the reflecting surfaces of the interference filter corresponding to an odd multiple of $\pi/2$.

21. A method according to claim 20, wherein the reflector exhibiting the polarization-dependence of the phase of reflection comprises a relief laminar-grating acting on a phase grating, the grating constant of which is selected to be smaller than the wavelength of light used for the transmission of the measurant-value.

22. A method according to claim 17, wherein the modulator influencing the light fluxes $I_1$ and $I_2$ used for the transmission of the measurant value in a monotonous relation thereto is a polarizer and including adjusting the polarizer to different polarization states in dependence of the measurant.

23. A method according to claim 22, wherein the polarizer is a linear polarizer and including controlling the azimutal orientation of said polarizer in dependence of the measurant.

24. A method according to claim 17, wherein the modulator comprises a polarizer and a birefringent element and including controlling the birefringence of said polarizer in dependence of the measurant.

25. A method according to claim 5, including designing the transducer as a reflection unit optically connected to the evaluation unit by an optical fiber, the fiber end arranged far from the transducer forming a common input- output-interface at which incident light, which is to be modulated in the transducer, is coupled into the fiber and into the transducer, respectively, and at which the light fluxes $I_1$ and $I_2$ emerging from the transducer in the reverse direction are coupled out and thereafter directed to the evaluation unit, between said interface and the light supply unit and the evaluation unit, respectively, a partially transmissive mirror being arranged through which a fraction of the light fluxes $I_1$ and $I_2$ emerging from said fiber end is directed to the detection unit of the evaluation unit.

26. A method according to claim 25, including by a pair of filters as an input and an output stage of the transducer spatial separating the two light fluxes subjected within the transducer to an individual or common measurant dependent modulation; at least one reflector is provided reflecting said light fluxes $I_1$ and $I_2$ back to the pair of filters, the modulator, seen in the direction of light propagation, being arranged between said pair of filters and said reflector.

27. A method according to claim 25, including by a beam splitter as an input and output stage of the transducer, splitting an incoming light flux in accordance with a splitting ratio, which is determined by the measurant, into two partial light fluxes which are guided through a pair of filters defining the spectral composition of the light fluxes returning to the interface fiber end to a least one reflector which is arranged to reflect an incident light flux back into itself.

28. A method according to claim 25, including by a beam splitter as an input and an output stage of the transducer, splitting an incoming light flux in accordance with a splitting-ratio, which is determined by the measurant, into two partial light fluxes, these partial light fluxes being guided to separate reflection filters each of which defining the spectral composition of one of the partial light fluxes $I_1$ and $I_2$ which are reflected back to the far interface fiber end.

29. A method according to claim 27, wherein the reflection filters each comprise a serial arrangement of partially transmissive reflectors and including arranging said reflectors equidistantly along the direction of light propagation and oriented at right angles thereto, the optical distances $d_1$ and $d_2$ between the reflectors of said serial arrangements being different from each other and defined in such a manner that the interference orders of the light fluxes $I_1$ and $I_2$ reflected by these reflection filters are differing from each other by approximately an odd multiple of half an interference order.

30. A method according to claim 25, wherein the transducer comprises a polarization-dependent reflection filter selected to exhibit for each one of two orthogonal states of polarization a specific line-shaped reflection-characteristics resulting in the desired spectrally interspersed line-shaped structures of the spectral intensity-distributions of the reflected partial light fluxes $I_1$ and $I_2$ having the said orthogonal polarization states and; wherein between the reflection filter and the near end of the optical fiber optically connecting the transducer with the evaluation unit arranging a polarizer, which, in dependence on variations of the measurant, is adjusted to different states of polarization of light which is transmitted to the far fiber end interface.

31. A method according to claim 30, wherein the polarization dependent reflection filter is formed by arranging an optical series-connection of partially reflective birefringent layers of equal thickness and of equidistant along the direction of light propagation.

32. A method according to claim 25, wherein the transducer comprises a polarization-dependent reflection filter selected to exhibit for each one of two orthogonal states of polarization specific line-shaped reflection-characteristics resulting in the desired spectrally interspersed line-shaped structures of the reflected partial light fluxes reflection filter exhibiting for each one of two orthogonal states of polarization specific line-shaped reflection-characteristics resulting in the desired spectrally interspersed line-shaped structures of the reflected partial light fluxes $I_1$ and $I_2$ having the said orthogonal polarization states, wherein further arranging a polarizer defining a selected state of polarization between said filter and the near end of the optical fiber optically connecting the transducer with the evaluation unit, and wherein arranging between said polarizer and said reflection filter a transparent body which exhibits a varying birefringence dependent on variations of the measurant.

33. A method according to claim 32, wherein the transparent body consists of an elasto-optic material, and including imparting by a force varying in relation to variations of the measurant and acting on the body in a transverse direction with respect to the direction of light propagation, a birefringence in relation to said force.

* * * * *